(12) United States Patent
Yates et al.

(10) Patent No.: US 12,130,222 B2
(45) Date of Patent: Oct. 29, 2024

(54) CONDENSATION PARTICLE COUNTERS AND METHODS OF USE

(71) Applicant: PARTICLE MEASURING SYSTEMS, INC., Boulder, CO (US)

(72) Inventors: Edward Yates, Boulder, CO (US); Cary Hertert, Boulder, CO (US); Brian A. Knollenberg, Boulder, CO (US)

(73) Assignee: PARTICLE MEASURING SYSTEMS, INC., Boulder, CO (US)

( * ) Notice: Subject to any disclaimer, the term of this patent is extended or adjusted under 35 U.S.C. 154(b) by 381 days.

(21) Appl. No.: 17/839,565

(22) Filed: Jun. 14, 2022

(65) Prior Publication Data

US 2022/0397510 A1 Dec. 15, 2022

Related U.S. Application Data

(60) Provisional application No. 63/210,748, filed on Jun. 15, 2021.

(51) Int. Cl.
| | | |
|---|---|---|
| *G01M 15/10* | (2006.01) | |
| *G01N 15/10* | (2006.01) | |
| *G01N 15/14* | (2006.01) | |

(52) U.S. Cl.
CPC ............. *G01N 15/10* (2013.01); *G01N 15/14* (2013.01); *G01N 2015/1024* (2024.01); *G01N 2015/1486* (2013.01)

(58) Field of Classification Search
CPC ................... G01N 15/10; G01N 15/14; G01N 2015/1024; G01N 2015/1486
See application file for complete search history.

(56) References Cited

U.S. PATENT DOCUMENTS

| 2,915,939 A | 12/1959 | Luik |
| 2,956,435 A | 10/1960 | Rich |

(Continued)

FOREIGN PATENT DOCUMENTS

| WO | WO 2020/102032 | 5/2020 |
| WO | WO 2021/176238 | 9/2021 |

OTHER PUBLICATIONS

International Search Report and Written Opinion, dated Nov. 8, 2022, corresponding to International Application No. PCT/US202233327, 12 pp.

(Continued)

*Primary Examiner* — Jamel E Williams
(74) *Attorney, Agent, or Firm* — Leydig, Voit & Mayer, Ltd.

(57) ABSTRACT

Disclosed is a method for detecting and/or growing particles, comprising controlling the surface area exposed to the saturator region by monitoring at least one of a depth of the working liquid on the saturator surface, the surface area exposed to the saturator region, or a volume of the working liquid on the saturator surface. Also disclosed is an apparatus or system for detecting and/or growing particles, comprising a fluidics system configured to control the surface area exposed to the saturator region by monitoring at least one of a depth of the working liquid on the saturator surface, the surface area exposed to the saturator region, or a volume of the working liquid on the saturator surface. Certain aspects do not employ one or more porous structures for vapor generation, nor a separate carrier fluid flow or inlet comprising a carrier fluid and vaporized working liquid for combining with the sample flow in the saturator region.

46 Claims, 12 Drawing Sheets

(56) References Cited

U.S. PATENT DOCUMENTS

| | | | |
|---|---|---|---|
| 4,594,715 A | 6/1986 | Knollenberg | |
| 4,893,928 A | 1/1990 | Knollenberg | |
| 5,026,155 A | 6/1991 | Ockovic et al. | |
| 5,072,626 A | 12/1991 | Ensor et al. | |
| 5,084,629 A | 1/1992 | Petralli | |
| 5,282,151 A | 1/1994 | Knollenberg | |
| 5,283,199 A | 2/1994 | Bacon et al. | |
| 5,671,046 A | 9/1997 | Knowlton | |
| 5,675,405 A | 10/1997 | Schlidmeyer et al. | |
| 5,726,753 A | 3/1998 | Sanberg | |
| 5,751,422 A | 5/1998 | Mitchell | |
| 5,805,281 A | 9/1998 | Knowlton et al. | |
| 5,861,950 A | 1/1999 | Knowlton | |
| 5,903,338 A * | 5/1999 | Mavliev | G01N 15/065 356/37 |
| 5,993,338 A * | 11/1999 | Kato | G05B 13/0255 474/18 |
| 6,167,107 A | 12/2000 | Bates | |
| 6,275,290 B1 | 8/2001 | Cerni et al. | |
| 6,615,679 B1 | 9/2003 | Knollenberg et al. | |
| 6,709,311 B2 | 3/2004 | Cerni | |
| 6,712,881 B2 | 3/2004 | Hering et al. | |
| 6,829,044 B2 | 12/2004 | Liu | |
| 6,859,277 B2 | 2/2005 | Wagner et al. | |
| 6,903,818 B2 | 6/2005 | Cerni et al. | |
| 6,945,090 B2 | 9/2005 | Rodier | |
| 7,030,980 B1 | 4/2006 | Sehler et al. | |
| 7,088,446 B2 | 8/2006 | Cerni | |
| 7,088,447 B1 | 8/2006 | Bates et al. | |
| 7,208,123 B2 | 4/2007 | Knollenber et al. | |
| 7,235,214 B2 | 6/2007 | Rodier et al. | |
| 7,456,960 B2 | 11/2008 | Cerni et al. | |
| 7,667,839 B2 | 2/2010 | Bates | |
| 7,719,683 B2 | 5/2010 | Ahn | |
| 7,746,469 B2 | 6/2010 | Shamir et al. | |
| 7,796,255 B2 | 9/2010 | Miller | |
| 7,973,929 B2 | 7/2011 | Bates | |
| 7,985,949 B2 | 7/2011 | Rodier | |
| 8,109,129 B2 | 2/2012 | Gorbunov | |
| 8,174,697 B2 | 5/2012 | Mitchell et al. | |
| 8,194,234 B2 | 6/2012 | Hopke et al. | |
| 8,208,132 B2 | 6/2012 | Huetter et al. | |
| 8,427,642 B2 | 4/2013 | Mitchell et al. | |
| 8,465,791 B2 | 6/2013 | Liu et al. | |
| 8,711,338 B2 | 4/2014 | Liu et al. | |
| 8,800,383 B2 | 8/2014 | Bates | |
| 8,869,593 B2 | 10/2014 | Gorbunov et al. | |
| 9,141,094 B2 | 9/2015 | Pariseau et al. | |
| 9,157,847 B2 | 10/2015 | Pariseau et al. | |
| 9,158,652 B2 | 10/2015 | Pariseau | |
| 9,631,222 B2 | 4/2017 | Ketcham et al. | |
| 9,638,665 B2 | 5/2017 | Gorbunov et al. | |
| 9,808,760 B2 | 11/2017 | Gromala et al. | |
| 9,810,558 B2 | 11/2017 | Bates et al. | |
| 9,885,640 B2 | 2/2018 | Ketcham et al. | |
| 9,989,462 B2 | 6/2018 | Lumpkin | |
| 10,197,487 B2 | 2/2019 | Knollenber et al. | |
| 10,228,316 B2 | 3/2019 | Bergmann et al. | |
| 10,330,578 B2 | 6/2019 | Manautou et al. | |
| 10,488,313 B2 | 11/2019 | Moenkemoeller | |
| 10,520,414 B2 | 12/2019 | Avula et al. | |
| 10,578,539 B2 | 3/2020 | Remiarz et al. | |
| 10,792,694 B2 | 10/2020 | Gorbunov et al. | |
| 10,859,487 B2 | 12/2020 | Knollenberg et al. | |
| 10,914,667 B2 | 2/2021 | Avula et al. | |
| 10,921,229 B2 | 2/2021 | Shamir | |
| 10,928,293 B2 | 2/2021 | Knollenberg et al. | |
| 10,983,040 B2 | 4/2021 | Pariseau | |
| 10,997,845 B2 | 5/2021 | MacLaughlin et al. | |
| 11,169,070 B2 | 11/2021 | Berger et al. | |
| 11,181,459 B2 | 11/2021 | Oberreit | |
| 11,215,546 B2 | 1/2022 | MacLaughlin | |
| 11,231,345 B2 | 1/2022 | Scialo et al. | |
| 11,237,095 B2 | 2/2022 | Rodier et al. | |
| 11,255,760 B2 | 2/2022 | Scialo et al. | |
| 11,268,930 B2 | 3/2022 | Rodier et al. | |
| 11,320,360 B2 | 5/2022 | Lumpkin et al. | |
| 11,385,161 B2 | 7/2022 | Bates et al. | |
| 11,416,123 B2 | 8/2022 | Pandolfi et al. | |
| 11,428,617 B2 | 8/2022 | Knollenberg et al. | |
| 2008/0037004 A1 | 2/2008 | Shamir et al. | |
| 2009/0009748 A1* | 1/2009 | Ahn | G01N 15/065 356/37 |
| 2011/0203931 A1 | 8/2011 | Novosselov et al. | |
| 2013/0227929 A1 | 9/2013 | Kulkarni et al. | |
| 2015/0075301 A1 | 3/2015 | Scialo et al. | |
| 2017/0241893 A1 | 8/2017 | Walls et al. | |
| 2020/0072724 A1* | 3/2020 | Knollenberg | G01N 1/02 |
| 2020/0240896 A1 | 7/2020 | Karasikov et al. | |
| 2021/0025806 A1 | 1/2021 | Pariseau et al. | |
| 2021/0044978 A1 | 2/2021 | Michaelis et al. | |
| 2021/0088437 A1 | 3/2021 | Pariseau et al. | |
| 2021/0136722 A1 | 5/2021 | Scialo et al. | |
| 2021/0208054 A1 | 7/2021 | Ellis et al. | |
| 2021/0223273 A1 | 7/2021 | Scialo et al. | |
| 2021/0356374 A1 | 11/2021 | Han | |
| 2021/0381948 A1 | 12/2021 | Rodier et al. | |
| 2022/0397495 A1 | 12/2022 | Yates et al. | |
| 2022/0397519 A1 | 12/2022 | Knollenberg et al. | |

OTHER PUBLICATIONS

U.S. Appl. No. 17/839,839, filed Jun. 14, 2022.
U.S. Appl. No. 17/839,897, filed Jun. 14, 2022.

* cited by examiner

CONDENSATION PARTICLE COUNTERS AND METHODS OF USE

CROSS-REFERENCE TO RELATED APPLICATIONS

This application claims the benefit of and priority to U.S. Provisional Patent Application No. 63/210,748, filed Jun. 15, 2021, which is hereby incorporated by reference in its entirety.

BACKGROUND

This invention is generally in the field of detecting, characterizing and/or counting particles in samples and process environments, including detection of sub-micron particles in cleanroom environments.

Monitoring fluid streams for the presence of contaminants, including sub-micron particles, is of importance in a number of industries, including semiconductors and microelectronics pharmaceuticals and biologicals, food and beverage, and cosmetics. The presence of particles even at very low levels in these industries can detrimentally impact manufacturing processes and fabrication performance. In addition, regulatory conditions and industry standards include establishing and maintaining low particle levels to comply with the requirements of relevant process condition certifications.

To address the impact of particulate contamination, cleanrooms and clean zones are commonly employed in diverse manufacturing and fabrication settings and facilities wherein the presence and amounts of particles and other contaminants are actively monitored and documented. In the semiconductor and microelectronics industries, for example, particles that settle on wafers and substrates may degrade or interfere with the small length scale manufacturing processes. Therefore, establishing cleanroom conditions in these industries is critical for maintaining fabrication efficiency and output. In the manufacture of pharmaceutical and biologicals, on the other hand, contamination by airborne particulates consisting of viable biological contaminants puts therapeutic products at risk due to health and safety concerns requiring compliance with stringent standards established by the US Food and Drug Administration (FDA) and other foreign and international health regulatory agencies.

Various systems and methods have been developed for monitoring for the presence of particles in connection with clean room environments, including the use of optical particle counters configured to detect electromagnetic radiation scattered or transmitted by particles for counting and size characterization. Such systems provide a versatile and robust particle analysis platform for detection and size characterization for particles having size dimensions greater than 500 nm. There are significant challenges, however, for reliably detecting particles having size dimensions <100 nm using convention optical particle counter systems due to lower signal-to-noise ratios encountered using these techniques for such smaller particles. These challenges result in problems for cleanroom monitoring applications, such as decreased sensitivity and/or increases in the frequency of false positive detection events that can lead to loss of products and/or ineffective certification for regulatory requirements and industry standards.

To address these limitations, condensation particle counters (CPCs) have been developed. Conventional CPCs generally operate by passing a sample of fluid-entrained particles through a chamber containing a vaporized working liquid. Subsequently, the particle containing stream including working liquid vapor are passed through a condenser, where working liquid vapor condenses onto the particles, resulting in growth such that the particles that can be detected more sensitively and reliably via optical particle counting techniques. Some conventional CPCs, for example, are based on a laminar flow thermal diffusion design, and employ "wicks" or other porous structures to facilitate the evaporation of the working liquid to form the working liquid vapor. Such existing CPCs suffer from disadvantages, including labor intensive maintenance, the use of a large volume of working liquid requiring frequent replacement, instrument flooding, the use of toxic working liquids, high false count rates (e.g., due to deterioration of the "wicks" or porous structures), large physical size for thermal diffusion condensation, low sample flow rates, and/or lack of adequate diagnostics.

In view of the foregoing, compact and reliable CPC instrumentation is needed able to facilitate efficient detection of small particles including particles having size dimensions <100 nm in process streams and cleanroom environments. Moreover, CPC instrumentation is needed that enable accurate detection and counting of particles at useful volumetric flow rates with higher sensitivity and lower susceptibility to false positive detection events.

SUMMARY

The present invention provides condensation particle counters for detecting particles in an environment and/or sample aerosol gas stream, as well as methods for growing and detecting such particles. The methods and devices of the present invention enable and enhance optical detection of small particles an environment or sample flow, including particles having effective sizes less than 10 nm particle.

In an aspect, systems and methods of the invention are "wickless" and, thus avoid the use of "wicks" or other porous structures for handling of work fluid and generating working liquid vapor saturation conditions. For example, CPC systems of certain aspects employ a pool or reservoir of working liquid for achieving working liquid vaporization and saturation of the sample fluid stream under analysis. The present systems have practical advantages over conventional wick-based systems including the ability to accurately monitor and control the pool or reservoir of working liquid to achieve and maintain highly reproducible vaporization and saturation conditions. In addition, systems employing a pool or reservoir of working liquid also allow for a compact form factor and more efficient fluidic handling and diagnostics for startup, maintenance and/or storage. Preferably for some embodiments, the level and surface area of the working liquid in the saturator region is monitored and controlled in real time to generate consistent formation of the working liquid vapor, thereby ensuring reproducible evaporation rates and partial pressures of working liquid vapor.

In an aspect, the systems and methods provide for a flow configuration allowing for mixing, saturation and condensation conditions to achieve effective and reproducible nucleation of working liquid and particle growth. In an embodiment, for example, systems and methods use a combination of turbulent mixing of the sample flow with working liquid vapor in a saturator region followed by a transition to a laminar flow thermal diffusion condensation growth region, after which the gas stream having enlarged particles is able to be directed to an optical particle detector or counter for effective detection and/or analysis. In an embodiment, for example, the incoming sample flow is directed into the saturator region in a direction perpendicular or substantially perpendicular to the surface of the pool or reservoir of working liquid, and the condensation flow stream, comprising the sample flow mixed with the working liquid vapor, is transported through the condensation growth region in a direction parallel or substantially parallel, though opposite in direction, to the incoming sample flow. This flow configuration is particularly beneficial as it allows for efficient transport of gas and condensation of vapor on particles within the sample flow while maintaining a compact design of the device. In some embodiments, the CPC systems and methods provide a fluid configuration compatible with analysis of high flow rate (>0.1 cfm) of process fluids and/or fluid from monitored environments, such as clean room environments.

In an aspect, the systems and methods enable a modular design wherein the working liquid container is removable and replaceable, for example, removable and replaceable relative to the optical detection components, fluid actuation components and/or data system components (e.g., data in or out). In some embodiments, for example, removable and replaceable working liquid container can constitute up to the entire fluidics assemble including but not limited to the working liquid reservoir, fluid level sensors, fluid level status indication, and working liquid transport pump. In some aspects, a manifold is connected to the apparatus to supply the sample flow and a docking station is provided comprising connections for vacuum, power, data, analog input output, digital input output, an ethernet switch, or any combination thereof.

In some aspects, disclosed herein is an apparatus or system for detecting and/or growing particles, the apparatus or system comprising: (i) a saturator region comprising a saturator surface, the saturator surface configured to support a working liquid that generates a working liquid vapor, wherein the working liquid comprises a bulk working liquid having a working liquid surface exposed to said saturator region characterized by a surface area; (ii) a fluid inlet in fluid communication with the saturator region, the fluid inlet terminating at a nozzle configured to direct a sample gas comprising particles against and/or into the working liquid vapor to produce a mixture in turbulent flow, the mixture comprising the sample gas and the working liquid vapor, (iii) a condenser in fluid communication with the saturator region, the condenser configured to receive and cool the mixture for condensing at least a portion of the working liquid vapor onto at least a portion of the particles, thereby forming grown particles, and (iv) a fluid outlet in fluid communication with the condenser configured to receive the grown particles, optionally wherein the bulk working liquid is a pool of working liquid wherein a fluidic property, thermal property or both of the pool of working liquid is sensed and/or monitored, for example sensed and/or monitored in real time.

In some aspects, disclosed herein is a method for detecting and/or growing particles, the method comprising: (i) providing an apparatus or system comprising a working liquid and a saturator region, wherein the working liquid comprises a bulk working liquid having a working liquid surface exposed to and interacting with a sample flow (e.g. in the saturator region), the working liquid surface characterized by a surface area, and the working liquid is positioned on a saturator surface in the saturator region, (ii) evaporating at least a portion of the working liquid to form a working liquid vapor, (iii) directing a sample flow comprising particles into the working liquid vapor, resulting in a mixture comprising the sample flow and the working liquid vapor, wherein the mixture is in turbulent flow, and (iv) transporting the mixture through a condenser and cooling the mixture therein, wherein at least a portion of the working liquid vapor condenses on at least a portion of the particles of the sample flow and increases the size of the particles of the sample flow, optionally wherein the bulk working liquid is a pool of working liquid wherein a fluidic property, thermal property or both of the pool of working liquid is sensed and/or monitored, for example sensed and/or monitored in real time.

Optionally, after condensation and increase of the size of the particles the gas containing the enlarged particles is guided to a particle detector and/or particle counter component, including but not limited to an optical particle counter, for detection and analysis. In an embodiment, directing the sample flow into the working liquid vapor comprises directing the sample flow toward, against and/or into the surface of the working liquid in the saturator region. Preferably, evaporating the working liquid is performed using a pool or reservoir of work fluid liquid configured to facilitate generation of the working liquid vapor, optionally substantially free of wicks and/or porous structures. Optionally for some embodiments, the working liquid vapor is preferably not delivered to the saturator region using a carrier gas but rather is transported by the sample flow stream itself.

Optionally, the method further comprises controlling the working liquid surface area exposed to the sample flow in the saturator region. In an embodiment, the working liquid surface area is controlled by increasing or decreasing the amount or volume of liquid working liquid in the saturator region, such as the amount or volume present in a liquid working liquid reservoir. In an embodiment, controlling the working liquid surface area further comprises monitoring at least one of: a depth of the working liquid on the saturator surface, the surface area exposed to the sample flow in the saturator region, a volume of the working liquid on the saturator surface, or any combinations thereof. Monitoring and controlling the working liquid may be achieved using fluidic sensors and actuators incorporated into the saturator region, for example, capable of delivering or removing working liquid to or from a working liquid reservoir.

In some aspects, disclosed herein is an apparatus or system for detecting and/or growing particles, the apparatus or system comprising: (i) a saturator region comprising a saturator surface, the saturator surface configured to support a working liquid that generates a working liquid vapor, (ii) a fluid inlet in fluid communication with the saturator region, the fluid inlet terminating at a nozzle configured to direct a sample flow comprising particles against and/or into the working liquid vapor to produce a mixture in turbulent flow, the mixture comprising the sample flow and the working liquid vapor, and (iii) a condenser in fluid communication with the saturator region, the condenser configured to receive and cool the mixture for condensing at least a portion of the working liquid vapor onto at least a portion of the particles, thereby forming enlarged particles, optionally wherein the working liquid is a pool of working liquid wherein a fluidic property, thermal property or both of the pool of working liquid is sensed and/or monitored, for example sensed and/or monitored in real time. A fluid outlet is optionally in fluid communication with the condenser and is configured to receive the enlarged particles, wherein enlarged particle may be subsequently provide to an particle counter such as an optical particle counter for analysis (e.g., counting). Additionally, the apparatus is optionally configured to transport the working liquid vapor to the condensation region using the sample flow stream itself, optionally in a flow configuration not using a separate carrier fluid flow.

In an embodiment, the working liquid, when present, comprises a bulk working liquid having a working liquid surface exposed to the saturator region, where the working liquid surface is characterized by a surface area, such as an average surface area. Preferably, the apparatus or system further comprises a fluidics system configured to control the surface area exposed to the saturator region by monitoring at least one of a depth of the working liquid on the saturator surface, the surface area exposed to the saturator region, a volume of the working liquid on the saturator surface, or combinations thereof. Fluidics systems useful for this aspect may include various fluidic components, such as valves, fluid actuators, pumps, sensors, etc. In an embodiment, the working liquid is subject to treatment, such as by filtering, cleaning, removal of impurities of the working liquid. In an embodiment, the working liquid is transported and/or recirculated to and from the saturator region, for example by a fluidic system, so as to allow for treatment of the working liquid, such as via the removal of particles, water, impurities and the like, so as to maintain or adjust the chemical composition and/or physical properties (e.g., vapor pressure) of the working liquid. Embodiments employing a recirculating working liquid may be beneficial for cleaning the working liquid before, during and/or after operation of the CPC so as to avoid buildup of impurities, chemical degradation and/or changes in physical properties (e.g., vapor pressure) of the working liquid which may negatively impact performance; e.g., with respect to sensitivity, reproducibility, false count rate, etc.

In an embodiment, the condenser comprises an inner wall positioned along a vertical axis and defining a central passageway, and an outer wall positioned along the vertical axis and encircling the inner wall. As a result, a circumferential passageway is formed between the inner wall and the outer wall. The central passageway is in fluid communication with and positioned between the fluid inlet and the nozzle, the circumferential passageway is in fluid communication with and positioned between the saturator region and a fluid outlet, and a fluid flow path is sequentially defined by the fluid inlet, the central passageway, the nozzle, the saturator region, the circumferential passageway, and the fluid outlet. In an embodiment, the condenser is a wetted wall condenser, for example, wherein at least a portion of the outer and/or inner walls of the condenser are wetted with a working liquid, which may be the same working liquid as used in the saturator region and/or a different working liquid. In some embodiments, the wetted wall condenser is wetted by establishing a flow of a working liquid on one or more surfaces of the condenser, such as surfaces of the outer and/or inner walls of the condenser. Embodiments incorporating a wetted wall condenser may be beneficial for establishing efficient condensation conditions (e.g., high vapor pressures of working liquid) and useful rates of condensation and enlargement of particles. Embodiments incorporating a wetted wall condenser may also allow for short residence times and/or more compact condenser form factors.

In a further embodiment, a portion of the inner wall that is exposed to the circumferential passageway comprises a first material, and at least a portion of the outer wall that is exposed to the circumferential passageway comprises a second material, wherein the first material has a lower thermal conductivity than the second material. Optionally, the first material, second material, or both, are actively controlled to produce a thermal gradient. Preferably, the thermal gradient matches the flow gradient, or is selected to work in conjunction with the flow gradient, to adjust or control the particle gradient across the cross section of the condenser.

In some embodiments, a method or an apparatus comprises a plurality of saturator regions, for example, saturator regions having the same working liquid or different working liquids, for example, provided in a parallel configuration or in a sequential configuration (e.g., in series). In some embodiments, a method or an apparatus comprises a plurality of condensers, for example provided in a parallel configuration or in a sequential configuration (e.g., in series). In some embodiments, a method or an apparatus comprises a plurality of saturator regions, condensers and/or particle detectors, for example, provided in a parallel configuration or in a sequential configuration (e.g., in series). Apparatus and methods of the invention include multistage CPC systems, wherein different stages are provided in a sequential configuration and correspond to individual CPCs targeting different particle size ranges.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

STATEMENTS REGARDING NOMENCLATURE

Figure 1:
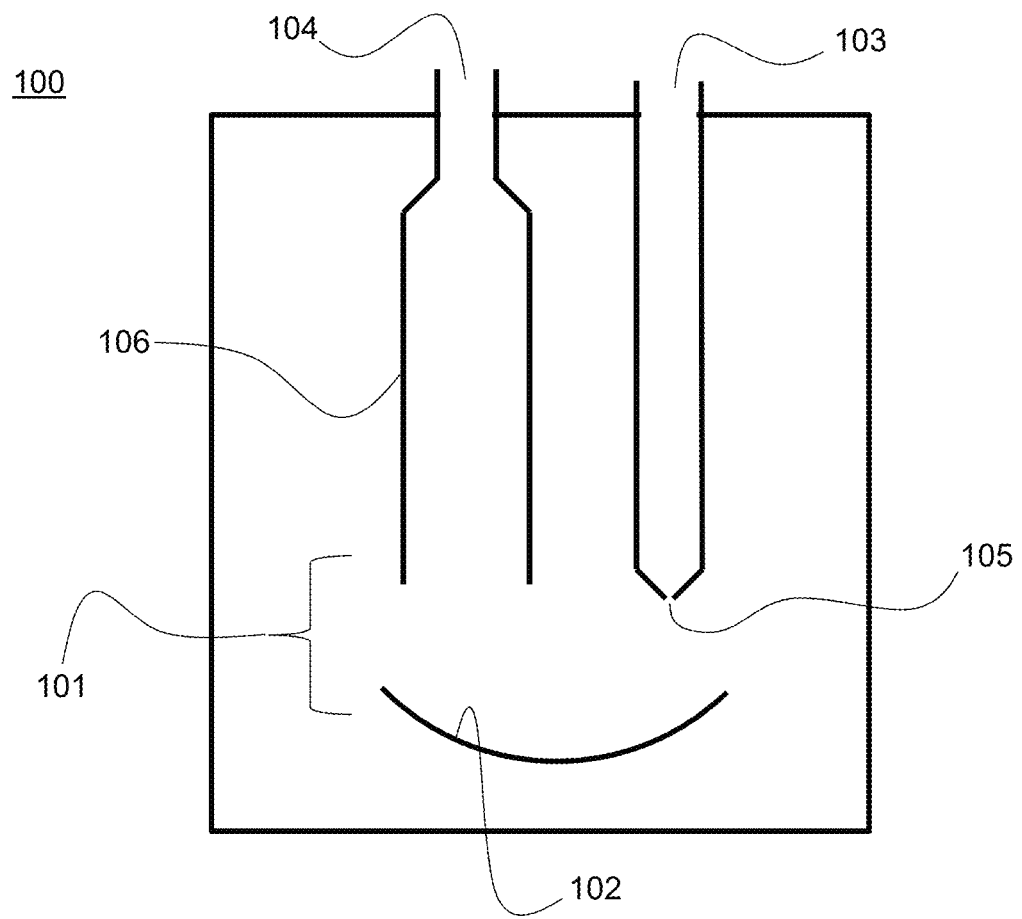
FIG. 1. depicts an aspect of a condensation particle counter, in which, during operation, a sample flow is directed perpendicular to the working liquid surface of the working liquid, if present.
Figure 2:
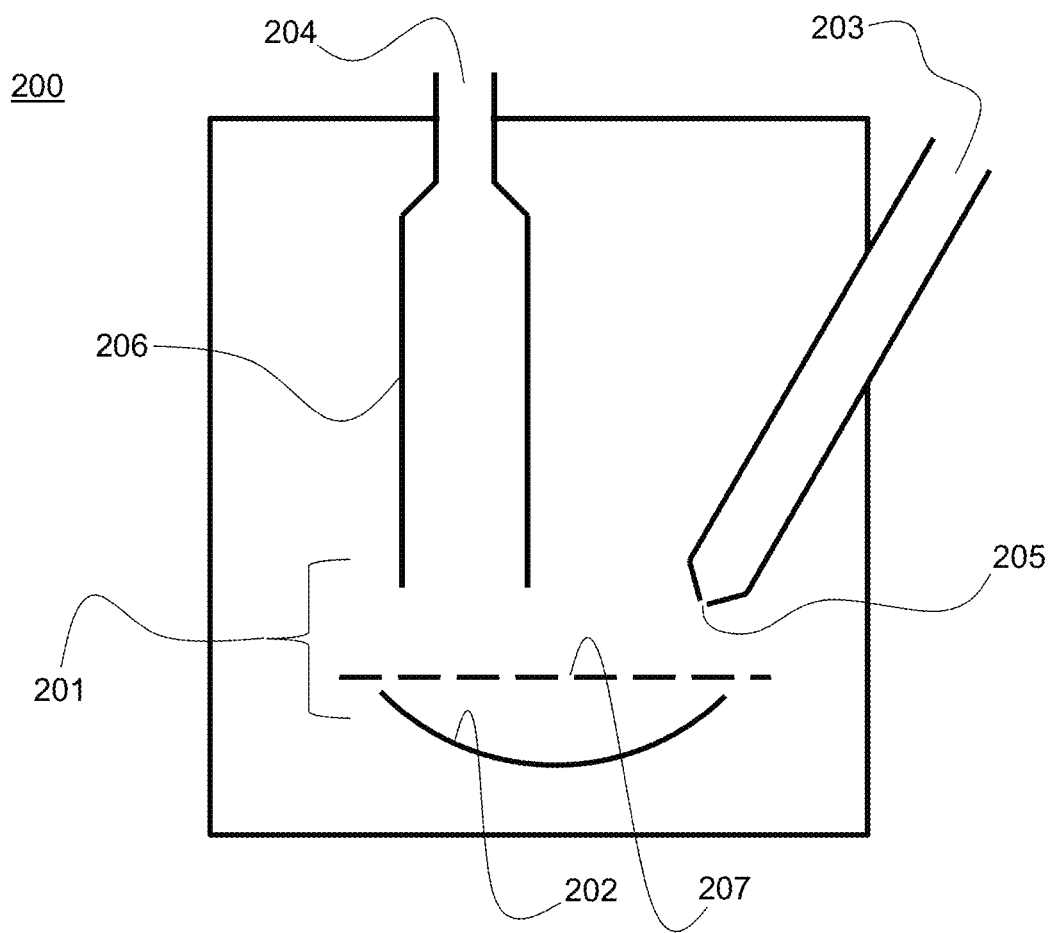
FIG. 2. depicts an aspect of a condensation particle counter in which, during operation, a sample flow is directed in an angled fashion toward the working liquid surface of the working liquid, if present. An optional cover is depicted covering the working liquid, if present, which cover may be perforated or unperforated.
Figure 3:
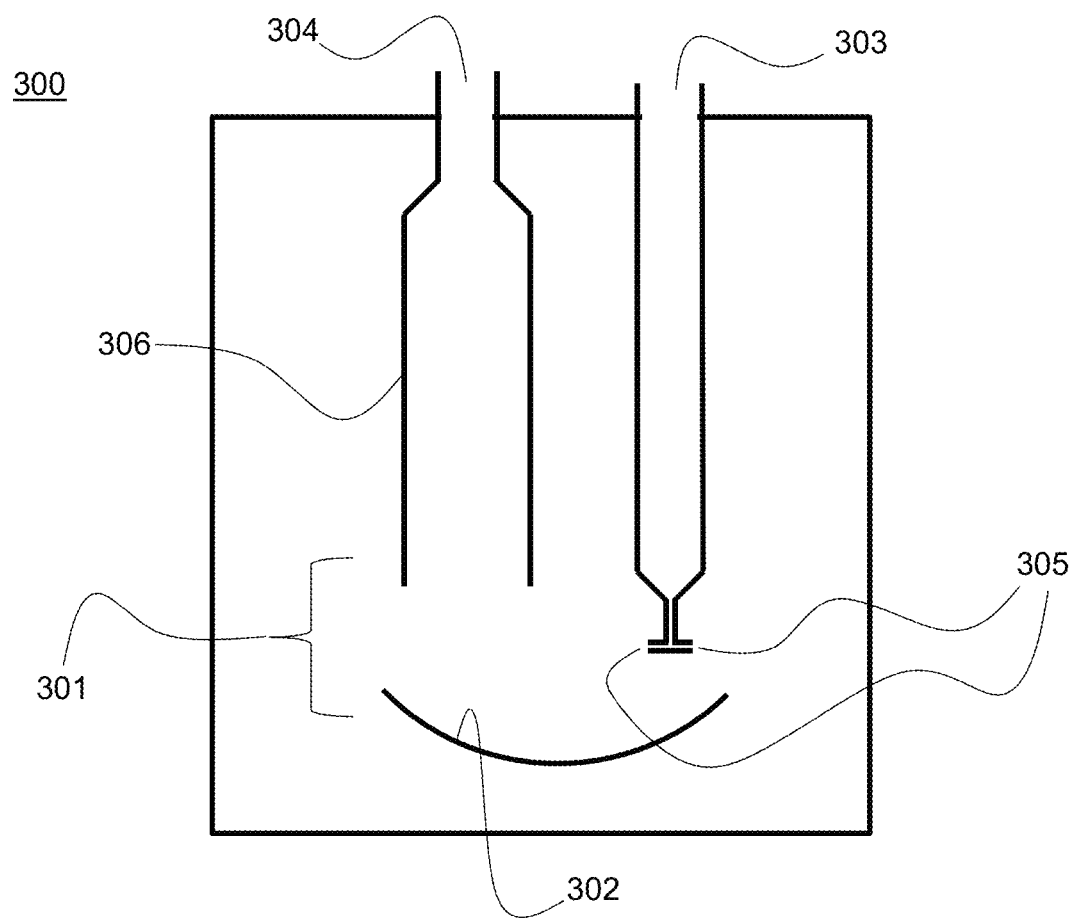
FIG. 3. depicts an aspect of a condensation particle counter in which the sample flow is directed into the saturator region via two nozzles. The nozzles are depicted to not be angled at the saturator surface, though one or both nozzles could be angled to do so in some aspects.
Figure 4:
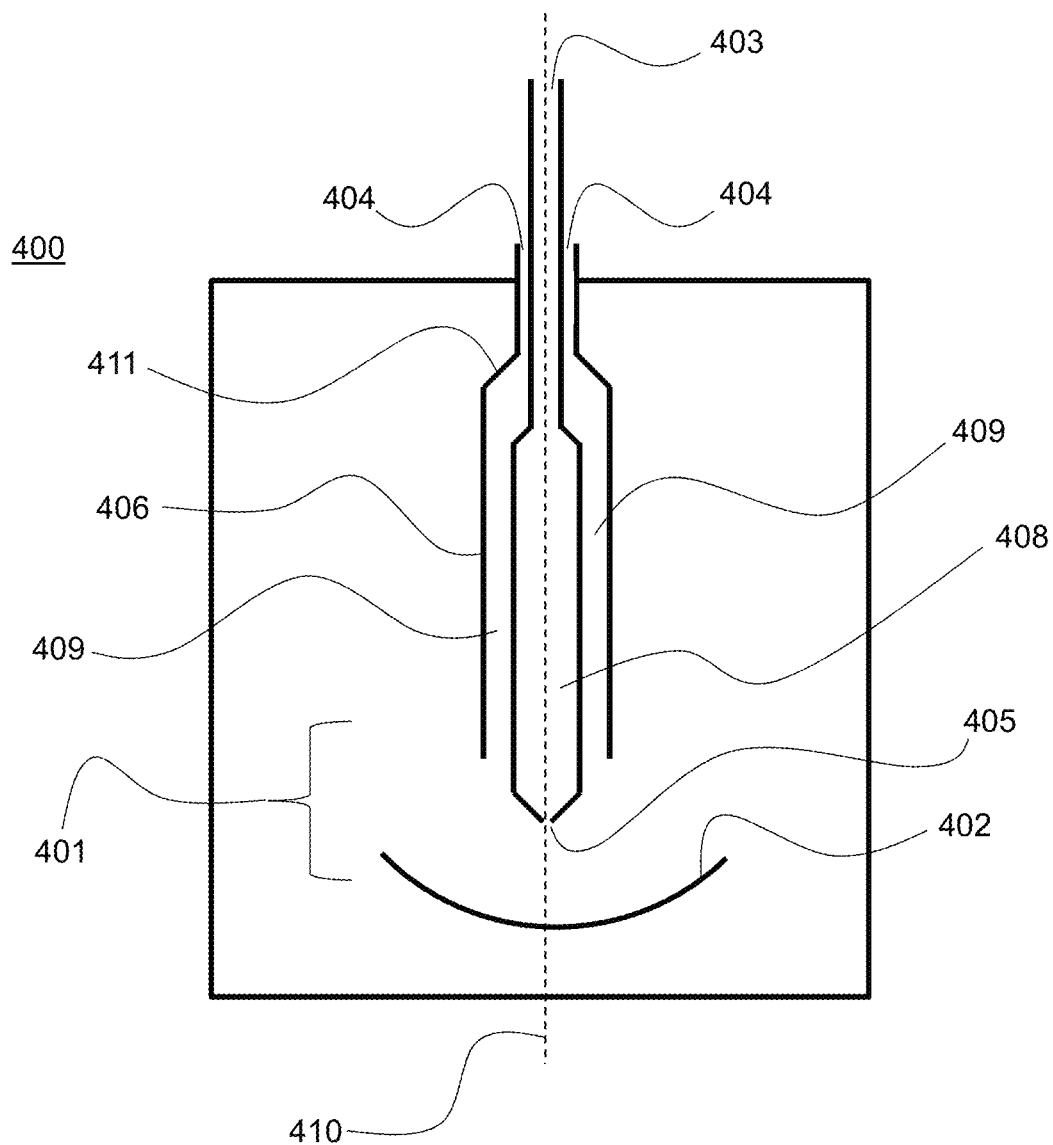
FIG. 4. depicts an aspect of a condensation particle counter in which the sample flow is fed through a central passageway, which is in a tube-in-tube configuration with the condenser.
Figure 5:
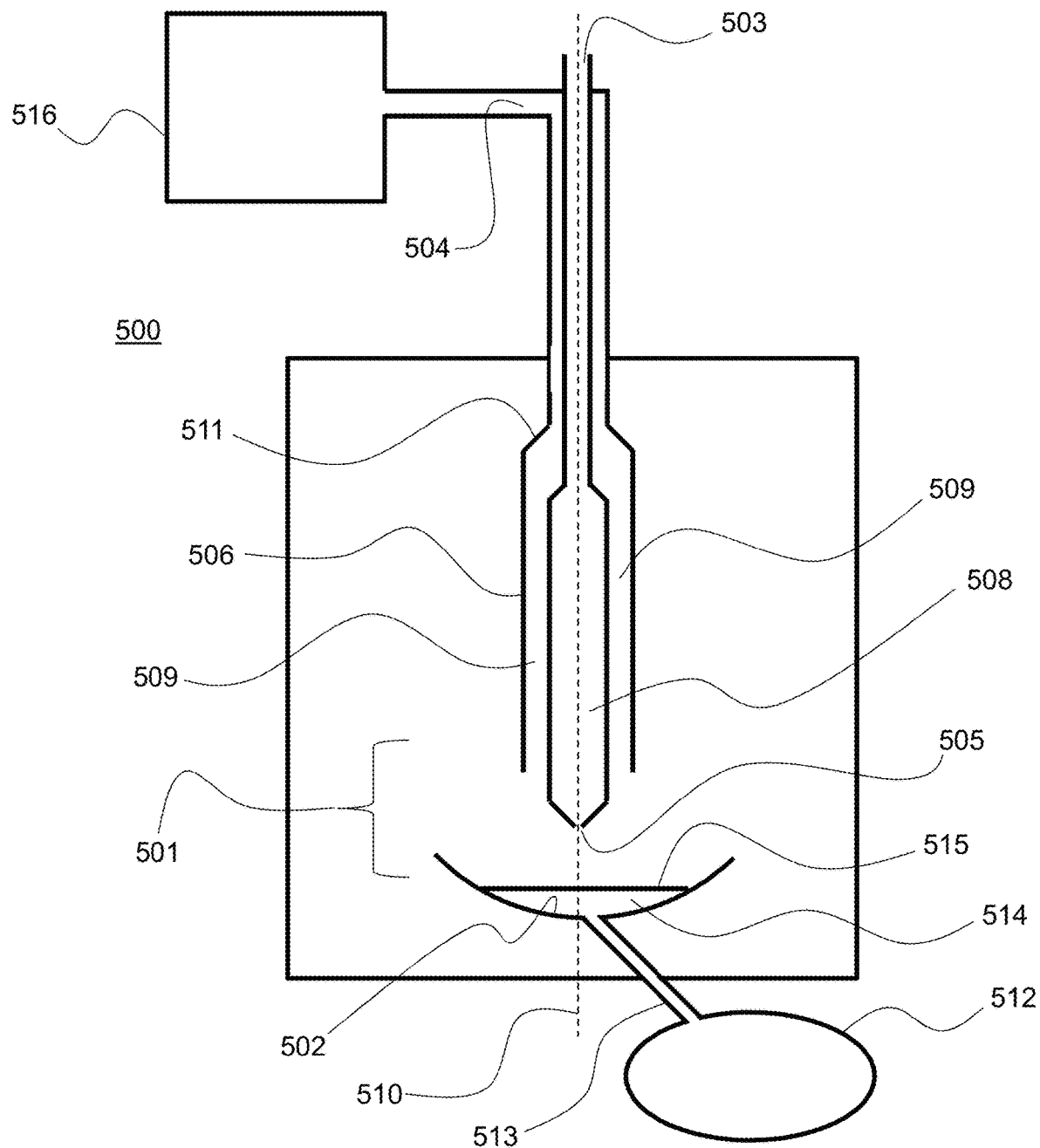
FIG. 5. depicts a further aspect of FIG. 4, in which a reservoir is present for supplying working liquid to the saturator surface, and an optical particle counter is present for receiving enlarged particles.
Figure 6:
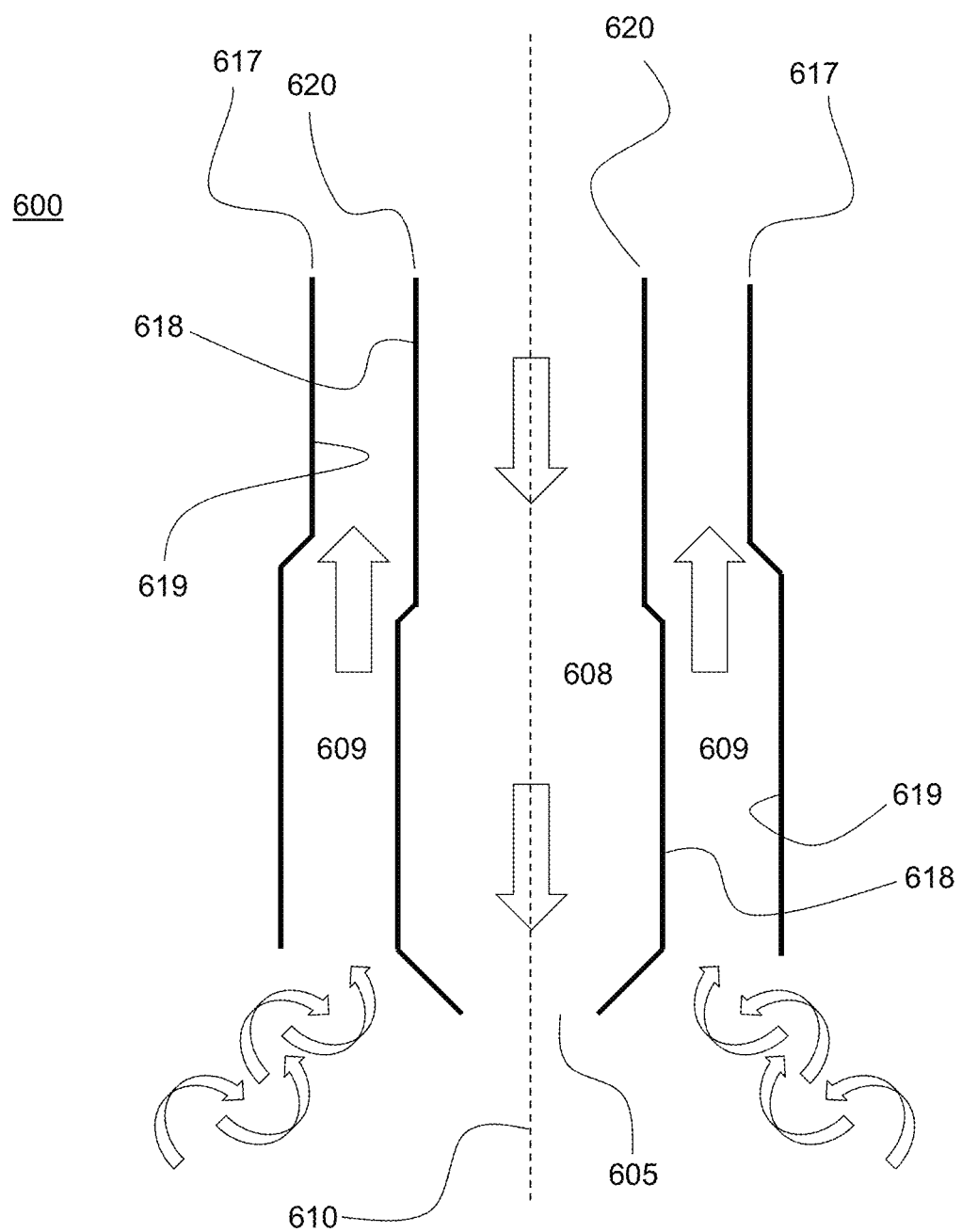
FIG. 6. depicts a detailed view of a tube-in-tube configuration of an aspect of a condensation particle counter. Straight arrows depict laminar flow and curved arrows indicate turbulent flow. Flow in the central passageway is parallel to, but in an opposite direction of, the flow in the condenser.

In general, the terms and phrases used herein have their art-recognized meaning, which can be found by reference to standard texts, journal references and contexts known to those skilled in the art. The following definitions are provided to clarify their specific use in the context of the invention.

The term "particle" or 'particles" refers to small objects which are often regarded as contaminants. A particle can be, but need not be, any material created by the act of friction, for example, when two surfaces come into mechanical contact and there is mechanical movement. Particles can be single components or composed of aggregates of material, and include dust, dirt, smoke, ash, water, soot, metal, oxides, ceramics, minerals, or any combination of these or other materials or contaminants. "Particle" or "particles" may also refer to biological particles, for example, viruses, spores, or microorganisms including bacteria, fungi, archaea, protists, or other single cell microorganisms. In some embodiments, for example, biological particles are characterized by a particle size (e.g., size dimension such as for example effective diameter) of 1 nm and greater, preferably less than 100 nm, less than 50 nm, less than 20 nm, less than 10 nm, less than 7 nm, less than 5 nm, or less than 3 nm. A particle may refer to a small object which absorbs, emits or scatters light and is thus detectable by a particle counter or an optical particle counter. As used herein, "particle" or "particles" is intended to be exclusive of the individual atoms or molecules of a carrier fluid or sample medium, for example, water, air, process chemicals, process gases, environmental gases, aerosol containing gases, nitrogen, oxygen, carbon dioxide, etc. In some embodiments, particles may be initially present on a surface, such as a tool surface in a microfabrication facility or production surface in a pharmaceutical fabrication facility, liberated from the surface and subsequently analyzed in a fluid. Systems and methods of the invention are particular effective for detecting, characterizing and/or counting small particles such as particles having a particle size selected from the range of 1 nm to 100 nm, optionally 1 nm to 50 nm, optionally 1 nm to 30 nm, optionally 1 nm to 20 nm and optionally, optionally 1 nm to 10 nm.

The term "particle size," as used herein, refers to the average or effective diameter of particles, the average or effective length of particles, the average or effective width of particles, the equivalent spherical diameter (diameter of sphere of equivalent volume) of particles, or the largest dimension of a particle, as will be clear from context.

The expression "detecting a particle" broadly refers to sensing, identifying the presence of and/or characterizing a particle. In some embodiments, detecting a particle refers to counting particles. In some embodiments, detecting a particle refers to characterizing and/or measuring a physical characteristic of a particle, such as diameter, cross sectional dimension, shape, size, aerodynamic size, or any combination of these. A particle counter is a device for counting the number of particles in a fluid or volume of fluid, and optionally may also provide for characterization of the particles, for example, on the basis of size (e.g., cross sectional dimension such as diameter or effective diameter), particle type (e.g. biological or nonbiological), or particle composition. An optical particle counter is a device that detects particles by measuring scattering, emission, transmission and/or absorbance of light by particles.

"Particle counter" refers to a system for detecting and counting particles. Particle counters include optical particles counters and particle counters using non-optical techniques such as Coulter method, charging/measuring charge, zeta potential, vision based particle counting systems, etc. Particle counters are useful for detecting particles in a fluid flow, such as a fluid flow from an environment undergoing monitoring, such as a clean room. Particle counters are useful for detecting particles in a fluid flow corresponding to a process fluid, such as one or more process gas or liquid.

"Optical Particle Counter" refer to a particle detection system that uses optical analysis and/or detection to detect, count and/or characterize particles, for example, by analyzing particles in a fluid flow and/or a fluid sample. Optical particle counters include liquid particle counters and aerosol particle counters, for example, including systems capable of detecting individual single particle(s) in a fluid flow, such as a flow of liquid or gas, and characterizing the number of particles per volume of fluid analyzed, for example, on the basis of a particle size criteria or ranges of size criteria, such as ranges of average or effective particle size, such as average or effective diameter, average or effective length and/or average or effective width (e.g., one or more size bin).

Particle counters may include condensation particle counters (CPCs), condensation nuclei counters and the like. CPCs may be configured, for example, to detect and/or count particles in a fluid flow such as a gas flow corresponding to a process environment or process gas(es). CPCs may integrate a saturator region and condensation region upstream of a detection region, to provide for condensation and growth of working liquid on particles in a sample stream to enlarge the particles allowing for more accurate and reliable detection, for example using optical detection methods. CPCs have beneficial applications for the detection and counting of small particles, such as particles having a size less than 100 nm, optionally less than 50 nm, optionally less than 30 nm, optionally less than 10 nm. In some embodiments at CPC may optionally have a cut off filter for removing larger particles form the particle sample stream under analysis, such as particle having a particle size greater than 100 micron, optionally 10 micron, optionally 500 nm. CPC's may provide a count of detectable particles meeting a certain size criteria, such as less than a certain particle size threshold, or alternatively particles having a particle size falling within a certain particle size range. CPC's also include multi-channel CPC instruments capable of determining the number of particles for multiple channels corresponding to different particle size criteria such as different particle size ranges (e.g., particle size bins). When used in the context of a condensation particle counter, the optical particle counter portion refers to the detection system (e.g. the source of electromagnetic radiation, optics, filters, optical collection, detector, processor, etc.) for characterizing particles that have undergone upstream nucleation and/or growth.

In some embodiments, optical particle counters provide a beam of electromagnetic radiation (e.g. via a laser or light emitting diode) into an interaction region, such as the analysis region of a flow cell, where the beam interacts with particles in a fluid flow. Illumination may involve focusing, filtering and/or shaping (e.g., elongation) the incident beam provided to the interaction region. Detection and/or characterization the particles may be achieved by detection and analysis of scattered, emitted and/or transmitted electromagnetic radiation from the interaction region. Detection may involve focusing, filtering and/or shaping electromagnetic radiation scattered, absorbed, obscured and/or emitted by the particle(s) on to one or more photodetectors such as an optical detector array. Various detectors for optical particle counters are known in the art, including for example, single detection elements (e.g., photodiode, photomultiplier tube, etc.), optical detector arrays (e.g., photodiode arrays, CMOS detectors, active-pixel sensors (APSs), charge-coupled devices (CCDs), a metal-oxide-semiconductor (MOS) detector, etc.), cameras, and may be implemented using various detector orientations as known in the art. Optical particle counters may incorporate differential detection, including split beam differential detection.

In an embodiment, for example, an optical particle counter comprises a source for generating a beam of electromagnetic radiation, beam steering and/or shaping optics for directing and focusing the beam into a region where a fluid sample is flowing, for example, a liquid or gas flowing through a flow cell. A typical optical particle counter comprises a photodetector, such as optical detector array, in optical communication with a flow cell, and collection optics for collecting, shaping and/or imagining electromagnetic radiation which is scattered, transmitted and/or emitted by particles which pass through the incident beam. Particle counters may further comprise electronics and/or processors (e.g., implemented by firmware and/or software) for readout, signal processing and/or analysis of electrical signals produced by the photodetector including current-to-voltage converters, pulse height analyzers, signal filtering electronics, amplification electronics, etc. An optical particle counter may also comprise one or more fluid actuation systems, such as a pump, fan, blower or the like, for generating a fluid flow for transporting a fluid sample containing particles through the analysis region of a flow cell, for example, for generating a measurement characterized by a volumetric flow rate. In some embodiments, optical particle counters include a fluid actuation system for generating a selected flow rate, such as a flow rate selected over the range of 0.05 CFM to 10 CFM, optionally for some applications 0.1 CFM to 5 CFM and optionally for some applications 0.5 CFM to 2 CFM. In some optical particle counters, flow rates are generated for samples comprising one or more liquids include a flow rate selected over the range of 1 to 1000 m L/min "Flow direction" refers to an axis parallel to the direction the bulk of a fluid is moving when a fluid is flowing. For fluid flowing through a straight flow cell, the flow direction is parallel to the path the bulk of the fluid takes. For fluid flowing through a curved flow cell, the flow direction may be considered tangential to the path the bulk of the fluid takes.

"Fluid communication" refers to the arrangement of two or more objects such that a fluid can be transported to, past, through or from one object to another. For example, in some embodiments two objects are in fluid communication with one another if a fluid flow path is provided directly between the two objects. In some embodiments, two objects are in fluid communication with one another if a fluid flow path is provided indirectly between the two objects, such as by including one or more other objects or flow paths between the two objects. For example, in one embodiment, the following components of a particle impactor are in fluid communication with one another: one or more intake apertures, an impact surface, a fluid outlet, a flow restriction, a pressure sensor, a flow generating device. In one embodiment, two objects present in a body of fluid are not necessarily in fluid communication with one another unless fluid from the first object is drawn to, past and/or through the second object, such as along a flow path.

"Sample flow" refers to a flow of a fluid, such as a gas containing and/or aerosol containing flow of fluid, undergoing analysis, such as analysis for detecting and/or counting particles. A sample flow may comprise particles to be detected by the present methods and systems. A sample flow may be directed from and/or result from transporting fluid, such as a gas and/or aerosol stream, from an environment undergoing monitoring such as a clean room environment or a process or fabrication environment. A sample flow may be, or derived from, one or more process fluids, such as one or more process gases or aerosol streams. A sample flow may be derived from surface(s) undergoing monitoring, for example, by liberating particles from the surface into a fluid flow, such as a gas stream.

"Flow rate" refers to an amount of fluid flowing past a specified point or through a specified area, such as through intake apertures or a fluid outlet of a particle impactor. In one embodiment, a flow rate refers to a mass flow rate, i.e., a mass of the fluid flowing past a specified point or through a specified area. In one embodiment, a flow rate is a volumetric flow rate, i.e., a volume of the fluid flowing past a specified point or through a specified area.

The term "saturator region" or "saturator" is a region or component of the apparatus or system where the working liquid vapor and the sample flow are contacted. Exposure of a sample flow stream under analysis to a working liquid provides for formation of working liquid vapor to the gas stream, resulting in conditions where the partial pressure of working liquid vapor is at or near (e.g., within 20%) of its equilibrium vapor pressure.

The term "condensation region" or "condenser" is a region or component wherein working liquid vapor condensing on particles in the gas stream. Condensation in the condensation region is achieved by having work fluid vapor present in the gas stream at or near saturation conditions and, optional by lowering the temperature of the gas stream having working liquid vapor.

"Working liquid" and "working fluid" are used interchangeable and refer to a liquid, solution or mixture providing vapor used to achieve condensation and/or enlargement of particles. In some embodiments, a working liquid is provided in a saturator region or saturator and provides a source of working liquid vapor for achieving condensation, for example, in a condenser provided in fluid communication with the saturator region or saturator. In some embodiments, a working liquid is pure, purified and/or substantially pure. In some embodiments, a working liquid is liquid, a mixture of liquids or a solution.

The term "bulk working liquid" refers to a volume of working liquid located below the working liquid surface of the working liquid. This term can best be illustrated by an example, such as a typical glass of drinking water: the glass holds the drinking water, the water has a surface that is exposed to the air, and below the surface is a continuous volume of the bulk liquid. The same concept can be translated to a working liquid positioned on a saturator surface: the saturator surface holds the working liquid, the working liquid surface is exposed to the atmosphere/environment within the apparatus or saturator region, and below the working liquid surface is a continuous volume of bulk working liquid.

The term "pool of working liquid" or "reservoir of working liquid" are used synonymously and refer to a volume of working liquid comprising a working liquid surface and a bulk working liquid, which volume (1) does not move or flow on the saturator surface, (2) moves or flows in a circular direction on the saturator surface, or (3) moves or flows in an defined direction, for example, in a recirculating liquid flow direction, or (4) moves or flows in an undefined direction on the saturator surface. By way of example, consider a bowl of working liquid, which during operation of an apparatus does not move or flow, moves or flows in a circular direction (either by stirring or as a consequence of the flowing sample flow or an applied force), or moves or flows in an undefined direction (either by stirring or as a consequence of the flowing sample flow or an applied force). In some embodiments, the pool of working liquid is not a film or thin film of working liquid, but rather has more volume than a film or thin film, such that a bulk working liquid is present. In some embodiments, the pool working liquid is recirculated, for example, in a manner providing for treatment of the working liquid, such as by filtering, cleaning, extracting impurities, etc. of the working liquid.

The term "stream of working liquid" refers to working liquid that is flowed from one portion of the saturator surface (or plate) to another portion of the saturator surface (or plate) in a directional manner, but not in a circular manner. The stream of working liquid typically is present as a film or thin film of working liquid and typically does not comprise a bulk working liquid. By way of example, consider a saturator surface that has a working liquid source on one end of the surface and the working liquid flows, either via gravity by a tilt in the saturator surface or by an applied force, across the saturator surface to a working liquid outlet, a working liquid pool, or neither (e.g., the stream of working liquid evaporates as it flows and therefore is not deposited in an outlet or pool).

When a given method, method step, apparatus, or apparatus component "is substantially free of one or more porous structures configured to facilitate generation of the working liquid vapor," such phrase means that one or more porous structures (e.g., "wicks") (1) are not present in the method, method step, apparatus, or apparatus component, (2) are present in the method, method step, apparatus, or apparatus component, but are not in contact with the working liquid (such that facilitation of working liquid vapor generation is not possible), (3) are present in the method, method step, apparatus, or apparatus component, and are in contact with the working liquid, but are not present in sufficient quantity to generate at least 30% of the working liquid vapor for mixing with sample flow in the saturator region, or (4) any combination thereof.

"Providing" refers to the step of having a composition, material, device, or component thereof present. In some embodiment, provide refers to having a system or component thereof present, for example, for sampling, detecting, analyzing and/or counting particles in a sample flow. In some embodiments, for example, a sample flow is provided to a CNC system, such as wherein a fluid actuator (e.g., pump, house vacuum line, blower, etc.) causes the sample flow to be introduced to the CNC system.

"Directing" refers to transporting, delivering, or otherwise moving something, such as a sample, a fluid flow or components or byproducts thereof, from one place or region to another place or region. In some embodiments, for example, directing refers to fluidically transporting a sample, fluid flow or components or byproducts thereof from a first region to a second region or from a first device component to a second device component. In some embodiments, for example, directing may occur via transport a sample, fluid flow or components or byproducts thereof from one device region or component to another device region component that are in fluid communication with each other. In some embodiments, for example, directing may occur via fluid actuation, such as by establishing a flow from one device component or region to another device component or region.

When disclosing numerical values herein, for example, 1, 2, 3, 4, 5, 6, 7, 8, 9, 10, the following sentence typically follows such numerical values: "Each of the foregoing numbers can be preceded by the term 'about,' 'at least,' 'at least about,' 'less than,' or 'less than about,' and any of the foregoing numbers can be used singly to describe a single point or an open-ended range, or can be used in combination to describe multiple single points or a close-ended range." This sentence means that each of the aforementioned numbers can be used alone (e.g., 4), can be prefaced with the word "about" (e.g., about 8), prefaced with the phrase "at least about" (e.g., at least about 2), prefaced with the phrase "at least" (e.g., at least 10), prefaced with the phrase "less than" (e.g., less than 1), prefaced with the phrase "less than about" (e.g., less than about 7), or used in any combination with or without any of the prefatory words or phrases to define a range (e.g., 2 to 9, about 1 to 4, at least 3, 8 to about 9, 8 to less than 10, about 1 to about 10, and so on). Moreover, when a range is described as "about X or less," this phrase is the same as a range that is a combination of "about X" and "less than about X" in the alternative. For example, "about 10 or less" is the same as "about 10, or less than about 10." Such interchangeable range descriptions are contemplated herein. Other range formats may be disclosed herein, but the difference in formats should not be construed to imply that there is a difference in substance.

As used herein, the term "about" or "substantially" means that slight variations from a stated value may be used to achieve substantially the same results as the stated value. In circumstances where this definition cannot be applied or is exceedingly difficult to apply, then the term "about" means a 10% deviation, optionally 5% (plus or minus) from the stated value or with 10 degrees, optional 5 degrees, of a given orientation (e.g. parallel, orthogonal, etc.).

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

In some aspects, disclosed herein is a method for detecting and/or growing particles, the method comprising:
providing an apparatus or system comprising a working liquid and a saturator region, wherein the working liquid comprises a bulk working liquid having a working liquid surface exposed to and interacting with a sample flow (e.g. in the saturator region), the working liquid surface characterized by a surface area, and the working liquid is positioned on a saturator surface in the saturator region, evaporating at least a portion of the working liquid to form a working liquid vapor, directing a sample flow comprising particles into the working liquid vapor positioned in the saturator region, resulting in a mixture comprising the sample flow and the working liquid vapor, wherein the mixture is optionally in turbulent flow, transporting the mixture through a condenser and cooling the mixture therein, wherein at least a portion of the working liquid vapor condenses on at least a portion of the particles of the sample flow and increases the size of the particles of the sample flow, directing the enlarged particles to an particle counter, such as an optical particle counter, and controlling the surface area exposed to the saturator region by monitoring at least one of a depth of the working liquid on the saturator surface, the surface area exposed to the saturator region, or a volume of the working liquid on the saturator surface.

In some aspects, disclosed herein is a method for detecting and/or growing particles, the method comprising:

providing an apparatus or system comprising a working liquid and a saturator region, wherein the working liquid comprises a bulk working liquid having a working liquid surface exposed to the saturator region characterized by a surface area, and the working liquid is positioned on a saturator surface in the saturator region, evaporating at least a portion of the working liquid to form a working liquid vapor, directing a sample flow comprising particles into the working liquid vapor and toward the working liquid surface, resulting in a mixture of the sample flow and the working liquid vapor, wherein the mixture is optionally in turbulent flow, and transporting the mixture through a condenser and cooling the mixture therein, wherein at least a portion of the working liquid vapor condenses on at least a portion of the particles of the sample flow and increases the size of the particles of the sample flow, directing the enlarged particles to an particle counter, such as an optical particle counter, and optionally controlling the surface area exposed to the saturator region by monitoring at least one of a depth of the working liquid on the saturator surface, the surface area exposed to the saturator region, or a volume of the working liquid on the saturator surface.

In some aspects, disclosed herein is a method for detecting and/or growing particles, the method comprising:

providing an apparatus or system comprising a working liquid and a saturator region, wherein the working liquid comprises a bulk working liquid having a working liquid surface exposed to said saturator region, the working liquid surface characterized by a surface area, and the working liquid is positioned on a saturator surface in the saturator region, evaporating at least a portion of the working liquid to form a working liquid vapor, directing a sample flow comprising particles into the working liquid vapor positioned in the saturator region, resulting in a mixture comprising the sample flow and the working liquid vapor, wherein the mixture is optionally in turbulent flow, and wherein the working liquid vapor is not delivered to the saturator region by a carrier gas comprising the working liquid vapor, transporting the mixture through a condenser and cooling the mixture therein, wherein at least a portion of the working liquid vapor condenses on at least a portion of the particles of the sample flow and increases the size of the particles of the sample flow, directing the enlarged particles to particle counter, such as an optical particle counter, and optionally, controlling the surface area exposed to the saturator region by monitoring at least one of a depth of the working liquid on the saturator surface, the surface area exposed to the saturator region, or a volume of the working liquid on the saturator surface.

In some aspects, disclosed herein is a method for detecting and/or growing particles, the method comprising:

providing an apparatus or system comprising a working liquid and a saturator region, wherein the working liquid comprises a bulk working liquid having a working liquid surface exposed to said saturator region, the working liquid surface characterized by a surface area, and the working liquid is positioned on a saturator surface in the saturator region, evaporating at least a portion of the working liquid to form a working liquid vapor, wherein the evaporating step is substantially free of one or more porous structures configured to facilitate generation of the working liquid vapor, directing a sample flow comprising particles into the working liquid vapor positioned in the saturator region, resulting in a mixture comprising the sample flow and the working liquid vapor, wherein the mixture is optionally in turbulent flow, transporting the mixture through a condenser and cooling the mixture therein, wherein at least a portion of the working liquid vapor condenses on at least a portion of the particles of the sample flow and increases the size of the particles of the sample flow, directing the enlarged particles to a particle counter, such as an optical particle counter, and optionally, controlling the surface area exposed to the saturator region by monitoring at least one of a depth of the working liquid on the saturator surface, the surface area exposed to the saturator region, or a volume of the working liquid on the saturator surface.

In some aspects, the apparatus or system employed in the method is the same apparatus or system described in detail elsewhere herein, and thus, in some aspects, such disclosures relating to the apparatus or system are equally applicable here.

In some aspects, controlling the surface area of the working liquid surface exposed to the saturator region provides various advantages to a CPC apparatus. For example, controlling the surface area allows the ability to control the evaporation rate of the working liquid, the saturation level of the working liquid vapor in the saturator region, or both. Moreover, the fluid level (e.g., working liquid level) can be monitored and controlled to give consistent performance by maintaining the same or similar available surface area of working liquid (e.g., working liquid) for vapor formation (e.g., working liquid vapor formation), the same amount of vapor interaction with the sample flow, and the same (or similar) and minimized thermal gradient across the active working liquid. Such features, in turn, allow the ability to keep the conditions within the saturator region controlled for optimized saturation of the sample flow with the working liquid vapor, affording reliable condensation of the working liquid vapor onto the particles (i.e., particle growth) in the condenser. In addition, employing only a small volume of liquid and small surface area relative to traditional CPCs, provides less contamination and degradation of the fluid, as only a small portion of the overall fluid (when a reservoir is employed) is exposed to the saturator region and heated (in such aspects when heating is employed), resulting in longer fluid life with equivalent or improved performance.

In some aspects, controlling the surface area (of the working liquid) exposed to the saturator region is achieved by monitoring a depth of the working liquid on the saturator surface. In some aspects, controlling the surface area exposed to the saturator region is achieved by monitoring the surface area exposed to the saturator region. In some aspects, controlling the surface area exposed to the saturator region is achieved by monitoring a volume of the working liquid on the saturator surface. In some aspects, controlling the surface area exposed to the saturator region is achieved by monitoring both the depth and the surface area. In some aspects, controlling the surface area exposed to the saturator region is achieved by monitoring both the surface area and the volume. In some aspects, controlling the surface area exposed to the saturator region is achieved by monitoring both the depth and the volume. In some aspects, controlling the surface area exposed to the saturator region is achieved by monitoring each of the depth, the surface area, and the volume. For clarity, the working liquid surface comprises the surface of the working liquid that is exposed to the atmosphere/environment within the apparatus, but does not include the portion of the working liquid that is in direct contact with the saturator surface (e.g., the working liquid surface does not include the portion of the working liquid that is, for example, at the bottom of a pool of working liquid in direct contact with the saturator surface).

In some aspects, such monitoring can be performed, for example, by employing one or more sensors configured to monitor such features of the working liquid positioned on the saturator surface. Sensors for monitoring depth, volume, or surface area of a liquid are known. In some aspects, if the depth, surface area, volume, or any combination thereof of the working liquid falls outside predetermined values, then additional working liquid is supplied to the saturator surface to return the depth, surface area, volume, or any combination thereof, to within the predetermined levels. Such supplying can be performed, in some aspects, using one or more pumps (optionally as part of a fluidics system), as described elsewhere herein, or via other methods, such as capillary action or gravity. Such sensors can also monitor one or more of fluid contamination, fluid degradation, system orientation, remaining operating time, or rate of fluid usage for the health of the system.

In some aspects, the method, apparatus, or system includes one or more diagnostics. In some embodiments, diagnostics are achieved by analysis of particle detection signals generated by the apparatus (e.g., pulse height, pulse width, pulse shape, etc.) and/or temporal profiles of observed particle detection signals. Embodiments, integrating diagnostics derived from analysis of particle detection signals (e.g., pulse height, pulse width, pulse shape, etc.) are useful for providing real time diagnostic information of parameters and specifications important for achieving and maintaining good system performance, such for monitoring working liquid properties (e.g., depth, volume, surface area, composition, impurities, health, etc. of working liquid), system flow properties (e.g., system flow rate, residence time in condenser and/or saturator region), optical detection properties, and thermal management properties (e.g., heat removal and dissipation). For example, in some aspects, a particle counter signal is fed to a field-programmable gate array (FPGA) to be utilized as a pulse height analyzer (PHA) for potential analysis of one or more of: (1) particle growth (overall system health) both on an individual detection particle event and historical for trend monitoring, (2) system flow rate, (3) sample particulate charge and/or material, (3) fluid contamination, (4) fluid degradation, or (5) any combination thereof. In some aspects, a fluid level sensor from reservoir and/or saturator is employed for potential analysis of at least one of (1) fluid contamination, (2) fluid degradation, (3) system orientation, (4) remaining operating time, (5) rate of fluid usage for health of system, or (6) any combination thereof. In some aspects, environmental sensors are integrated in the apparatus or method for potential analysis of at least one of: (1) changes in operational set points to maintain performance, (2) system self-protection in case of extreme environment, or (3) a combination thereof.

In some aspects, the method comprises comparing the depth, volume, surface area, or any combination thereof, of the working liquid to one or more target ranges of the depth, volume, and/or surface area, and, in the event the depth, volume, and/or surface area is outside the respective target range, adjusting the depth, volume, and/or surface area by supplying additional working liquid from a reservoir (e.g., by way of one or more pumps, capillary action, or gravity).

In some aspects, the saturator surface is a component of a saturator plate.

In some aspects, the target range of the surface area is any suitable amount, such as 0.01 to 500 cm$^2$, optionally for some embodiments 0.03 to 5 cm$^2$. In some aspects, the method further comprises supplying additional working liquid to maintain a target range of the surface area. For example, in some aspects, the surface area (cm$^2$) is 0.7 cm$^2$±20%. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range.

In some aspects, the target range of the depth is any suitable amount, such as 0.001 to 100 mm, optionally 0.1-10 mm. In some aspects, the method further comprises supplying additional working liquid to maintain a target range of the depth. For example, in some aspects, the depth (mm) is 5 mm±20%. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range.

In some aspects, the target range of the volume is any suitable amount, such as 0.001 to 5000 mL, optionally 0.01 to 100 mL, and optionally 0.1 to 10 mL. In some aspects, the method further comprises supplying additional working liquid to maintain a target range of the volume. For example, in some aspects, the volume (mL) is 0.4 mL±20%. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range.

In some aspects, the sample flow is passed through the apparatus or system during the method by way of a vacuum, vacuum pump, or house vacuum. In some aspects, the sample flow is passed through the apparatus or system during the method by way of positive pressure, for example, using a pump or fan.

In some aspects, the method can be employed with particles having any suitable particle size prior to condensation and increasing size in a condenser. For example, the particle sizes, prior to growing in a condenser, can range from 1 nm to 15 microns. The method is particularly useful, however, for detecting and/or counting particles in the sub-100 nm range (prior to growing in a condenser), for example, less than 75 nm, less than 50 nm, less than 25 nm, less than 15 nm, less than 10 nm, less than 9 nm, less than 8 nm, less than 7 nm, less than 6 nm, less than 5 nm, less than 4 nm, less than 3 nm, or less than 2 nm. For example, the particles can have a size (nm) (prior to growing in a condenser) of 1, 2, 3, 4, 5, 6, 7, 8, 9, 10, 11, 12, 13, 14, 15, 16, 17, 18, 19, 20, 21, 22, 23, 24, or 25. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the particle size, prior to growing in a condenser, is 3 nm to 9 nm, less than 10 nm, or 2 nm to 7 nm.

In some aspects, the sample flow comprises any suitable components. For example, the sample flow typically comprises particles, but in in some aspects the sample flow is free of, or substantially free of, particles (e.g., undetectable using standard cleanroom particle detection techniques), particularly when the sample flow is derived from a cleanroom environment that is operating under ideal, uncontaminated conditions such that the atmosphere/environment of the cleanroom environment is free of or substantially free of particles. In some aspects, the sample flow comprises a carrier fluid or sample medium, for example, air, process gases, nitrogen, argon, carbon dioxide, carbon monoxide, oxygen, or any combination thereof. In some aspects, the sample flow comprises the air present in the environment to be sampled, such as the air inside a cleanroom or manufacturing facility (e.g., semiconductor or pharmaceutical manufacturing facility). In some aspects, the sample flow consists of the air (and any particles contained therein) from the environment to be sampled. In some aspects, the air in the environment is mixed with a carrier fluid, such as additional air, process gases, nitrogen, argon, carbon dioxide, carbon monoxide, oxygen, or any combination thereof, prior to or during a method for detecting and/or growing particles disclosed herein, or prior to or during feeding such mixture to an apparatus or system disclosed herein, and in such cases the sample flow comprises the air from the environment to be sampled in combination with the carrier fluid. In some aspects, the sample flow not does contain a carrier fluid, and such sample flow consists of the air (and any entrained particles) present in the environment to be sampled.

In some aspects, the saturator region contains working liquid vapor. In aspects, the saturator region is saturated or substantially saturated with working liquid vapor. In some aspects, the saturator region is super saturated with working liquid vapor.

In some aspects, the saturator surface is positioned in the saturator region. In some aspects, the saturator surface is not positioned in the saturator region. In some aspects, the saturator surface is not positioned in the saturator region, and the working liquid vapor evaporated from the working liquid (positioned on the saturator surface) is in fluid communication with the saturator region.

In some aspects, the working liquid is positioned on the saturator surface. In some aspects, the saturator surface comprises a shape configured to support or contain the working liquid. In some aspects, the shape is a concave shape, for example, such as a bowl, a cup, or a plate. In some aspects, the shape is a "V," "U," "W," or other trench-like shape. In some aspects, the shape is flat, concave, convex, or conical, particularly in aspects that employ a stream of working liquid.

In some aspects, the method comprises evaporating at least a portion of the working liquid to form a working liquid vapor. In some aspects, to facilitate evaporation of the working liquid to form the working liquid vapor, the method comprises increasing the temperature of the working liquid, for example, by way of one or more heating elements. In some aspects, the temperature of the working liquid is increased to a temperature relative to the boiling point of the working liquid, for example, within 100° C., within 90° C., within 80° C., within 70° C., within 60° C., within 50° C., within 40° C., within 30° C., within 20° C., or within 10° C. of the boiling point of the working liquid. In some aspects, the temperature of the working liquid is increased to the boiling point of the working liquid. In some aspects, the method does not comprise increasing the temperature. In some aspects, the working liquid vapor evaporates as a consequence of (1) the surface area of the working liquid that is exposed to the saturator region, (2) the flow rate of the sample flow flowing through the apparatus, (3) whether the sample flow is directed at, toward, or against the working liquid surface, (4) the temperature of the working liquid, or (5) any combination thereof. In some aspects, the working liquid positioned on the saturator surface is heated (to one or more of the temperatures described herein), but the working liquid held in a reservoir in fluid communication with the saturator surface is not heated (to one of more of the temperatures described herein). In some aspects, both the working liquid positioned on the saturator surface and held in a reservoir in fluid communication with the saturator surface are heated.

In some aspects, the working liquid comprises a pool of working liquid or a stream of working liquid. In some aspects, the working liquid comprises a pool of working liquid and a stream of working liquid, for example, when a stream of working liquid is flowed across the saturator surface or other surface and into a pool of working liquid, or when a stream of working liquid is flowed from the pool and across the saturator surface or other surface. In some aspects, a saturator surface that has a working liquid source on one end of the surface and the working liquid flows, either via gravity by a tilt in the saturator surface or by an applied force, across the saturator surface to a working liquid outlet, a working liquid pool, or neither (e.g., the stream of working liquid evaporates as it flows and therefore is not deposited in an outlet or pool).

In some aspects, the method comprises directing a sample flow (optionally comprising particles) toward, against and/or into the working liquid vapor positioned in the saturator region, resulting in a mixture comprising the sample flow and the working liquid vapor. In some aspects, the resulting mixture is in turbulent flow. In some aspects, the method comprises directing a sample flow (optionally comprising particles) into the working liquid vapor and toward the working liquid surface, resulting in a mixture of the sample flow and the working liquid vapor. In some aspects, the resulting mixture is in turbulent flow. In some aspects, the directing step causes the sample flow to travel into the working liquid vapor and/or against the working liquid surface. In some aspects, the directing step causes the sample flow to travel into the working liquid vapor and/or against the working liquid surface without causing formation of bubbles of the sample flow in the bulk working liquid beneath the working liquid surface. In some aspects, the sample flow is not impinged into the working liquid. In some aspects, the directing step causes the sample flow to travel into the working liquid vapor and/or against the working liquid surface while causing formation of bubbles of the sample flow in the bulk working liquid beneath the working liquid surface. In some aspects, the sample flow is impinged into the working liquid.

In some aspects, the working liquid surface comprises a continuous plane configured in an orientation perpendicular or non-perpendicular to a direction of gravity. In some aspects, the continuous plane of the working liquid surface is bounded by the saturator surface. In some aspects, the working liquid surface is not formed as a result of the working liquid being present on one or more porous structures ("wicks").

In some aspects, the mixture comprises, consists of, or consists essentially of the sample flow (optionally containing particles) and the working liquid vapor. In some aspects, the mixture consists of the sample flow (optionally containing particles) and the working liquid vapor. As noted elsewhere herein, the sample flow, in some aspects, is comprised of the air of the environment to be sampled (with or without a carrier fluid and with or without entrained particles).

In some aspects, the working liquid vapor is in contact with the working liquid surface. In some aspects, the working liquid vapor is in contact with the working liquid surface, and the working liquid is positioned on the saturator surface in the saturator region. In some aspects, the working liquid vapor is not in contact with the working liquid surface. In some aspects, the working liquid vapor is not in contact with the working liquid surface, and the working liquid vapor is positioned in the saturator region, the working liquid is positioned on the saturator surface in an area of the apparatus that is not the saturator region, and the working liquid vapor in the saturator region is in fluid communication with the working liquid surface.

In some aspects, the evaporating step is substantially free of, or does not employ, one or more porous structures configured to facilitate generation of the working liquid vapor. In some aspects, the evaporating step does not employ one or more porous structures configured to facilitate generation of the working liquid vapor. In some aspects, the evaporating step is substantially free of one or more porous structures configured to facilitate generation of the working liquid vapor. In some aspects, the flow path of the apparatus or system is substantially free of, or does not contain, one or more porous structures that are configured to facilitate generation of the working liquid vapor. In some aspects, the apparatus or system does not contain one or more porous structures in contact with a working liquid. Traditional CPCs typically employ one or more porous structures to facilitate generation of the working liquid vapor, and typically without such one or more porous structures, an insufficient amount of working liquid vapor is produced to sufficiently saturate a sample flow to reliably grow particles in a condenser. However, in some aspects, the methods and apparatuses disclosed herein are capable of producing sufficient working liquid vapor to condense on and grow the particles for reliable detection without the use of, or substantially without the use of, one or more porous structures. In some aspects, it is advantageous to not employ a wick structure for one or more reasons, including at least one of: (1) preventing shedding that would produce false counts, (2) less particle loss since no interaction with a porous media, (3) higher flow rates since no restriction from flow through a porous media, (4) heating a wick can lead to wick degradation and subsequently contaminate the working liquid and any combination thereof. In any event, in some aspects, one or more porous structures are not employed in the methods or apparatuses disclosed herein to facilitate generation of the working liquid vapor.

In some aspects, the working liquid vapor is not delivered to the saturator region by a carrier gas comprising the working liquid vapor. In some aspects, the working liquid vapor is delivered to the saturator region by a carrier gas comprising the working liquid vapor. Traditional CPCs typically employ a carrier gas comprising a working liquid vapor that is contacted with the sample flow. However, in some aspects, the methods, apparatuses, and systems disclosed herein employ a working liquid on a saturator surface for generation of the working liquid vapor, and thus, in some aspects, do not require a carrier fluid to deliver the working liquid vapor to the saturator region for mixing with the sample flow. In some aspects, however, a carrier fluid can be employed in the methods, apparatuses, or systems disclosed herein to deliver the working liquid vapor to the saturator region.

In some aspects, the sample flow propagates through the apparatus at any suitable flow rate. In some aspects, the sample flow propagates through the apparatus at a flow rate of at least 0.1 L/min. In some aspects, the sample flow propagates through the apparatus at a flow rate of less than or equal to 100 L/min. In some aspects, the sample flow propagates through the apparatus at a flow rate selected over the range of 0.1 L/min to 100 L/min. In some aspects, the sample flow propagates through the apparatus at a flow rate (L/min) of 0.1, 0.2, 0.3, 0.4, 0.5, 0.6, 0.8, 1, 1.2, 1.4, 1.6, 1.8, 2, 2.2, 2.4, 2.6, 2.8, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 17, 18, 19, or 20. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the flow rate (L/min) is 0.1 to 15, at least 10, 8 to 16, or at least 5.

In some aspects, the working liquid comprises propylene glycol, water, isobutanol, n-butanol, sec-butanol, tert-butanol, isopropanol, 1-propanol, dimethyl phthalate, dioctyl phthalate, dimethylsulphoxide, or any combination thereof. In some aspects, the working liquid comprises, consists of, or consists essentially of propylene glycol. In some aspects, the working liquid comprises propylene glycol and at least one other working liquid, for example, water or isopropanol.

In some aspects, the working liquid has any suitable viscosity. In some embodiments, for example, the dynamic viscosity ($N \cdot s/m^2$) at 27° C. is 0.0001 to 1.0 $Ns/m^2$ and optionally 0.0005 to 0.001 $Ns/m^2$. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the dynamic viscosity ($N \cdot s/m^2$) at 27° C. is 0.001 $Ns/m^2 \pm 20\%$.

In some aspects, the working liquid has any suitable boiling point. In some aspects, the boiling point (° C.) is 100, 110, 120, 130, 140, 150, 160, 170, 175, 180, 185, 190, 195, 200, 205, 210, 220, or 230. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the boiling point (° C.) is 180 to 190, 185, 140 to 200, or at least 175.

In some aspects, the working liquid has any suitable specific gravity (calculated relative to water at 4° C.). In some aspects, the specific gravity is 0.8 to 2.0 g/mL. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the specific gravity is 1.035 to 1.04, 1.037, 1.02 to 1.05, or 1.09 to 1.2.

In some aspects, the working liquid has any combination of dynamic viscosity, boiling point, and specific gravity. For example, in some aspects, the working liquid has a dynamic viscosity of 0.0001 to 1.0 Ns/m$^2$, a boiling point of 80° C. to 230° C., a specific gravity of 0.8 to 2.0 g/mL, or any combination thereof. In some aspects, the working liquid has a dynamic viscosity of 0.0001 to 1.0 Ns/m$^2$ and a boiling point of 80° C. to 230° C. Any combination of two or more of dynamic viscosity, boiling point, and specific gravity can be made from any of the values disclosed herein.

In some aspects, the sample flow has substantially laminar flow prior to the directing step and during the transporting step. In some aspects, the sample flow has laminar flow prior to the directing step and during the transporting step. In some aspects, the sample flow has laminar flow, or substantially laminar flow, before entry to the saturator region. In some aspects, upon entry to the saturator region the sample flow transitions from laminar flow to turbulent flow and mixes with the working liquid vapor. In some aspects, the mixture of the sample flow and working liquid vapor in turbulent flow transitions to laminar flow upon entry into the condenser. In some aspects, the sample flow has turbulent flow, or substantially turbulent flow, before entry to the saturator region, and continues to have turbulent flow in the saturator region for mixing with the working liquid vapor. In some aspects, the mixture of the sample flow and working liquid vapor in turbulent flow transitions to laminar flow upon entry into the condenser.

In some aspects, the condenser comprises any suitable geometry. In some aspects, the condenser comprises a tube-in-tube configuration. In some aspects, the condenser comprises an inner wall positioned along a vertical axis of the apparatus and defining a central passageway, and an outer wall positioned along the vertical axis and encircling the inner wall, wherein a circumferential passageway is formed between the inner wall and the outer wall. In some aspects, the inner wall and outer wall have a shape that is circular, triangular, square, pentagonal, hexagonal, polygonal, or any combination thereof, about the vertical axis of the apparatus or system. In some aspects, the sample flow is flowed through the central passageway to the saturator region, and the mixture of sample flow and working liquid vapor flows through the circumferential passageway with cooling and particle growth occurs. In some aspects, at least a portion of the outer water that is exposed to the circumferential passageway is actively cooled, or at least a portion of the inner water that is exposed to the circumferential passageway is actively cooled, or both. In some aspects, at least a portion of at least one of the inner wall or outer wall exposed to the circumferential passageway is comprised of a material that is a thermal insulator (e.g., thermally non-conductive).

In some aspects, the condenser comprises an inner wall positioned along a vertical axis of the apparatus and defining a central passageway, and an outer wall positioned along the vertical axis and encircling the inner wall, wherein a circumferential passageway is formed between the inner wall and the outer wall,

- at least a portion of the inner wall that is exposed to the circumferential passageway comprises a first material,
- at least a portion of the outer wall that is exposed to the circumferential passageway comprises a second material, and
- the first material has a lower thermal conductivity than the second material, and
- the method further comprises cooling at least a portion of the outer wall that is exposed to the circumferential passageway and flowing the sample flow through the central passageway to the directing step,
- wherein the transporting is performed in the circumferential passageway, and the flowing is parallel to, but in an opposite direction of, the transporting.

In some aspects, at least a portion of at least one of the inner wall or outer wall exposed to the circumferential passageway is comprised of a material that is a thermal insulator (e.g., thermally non-conductive).

Suitable first materials include thermally insulating materials such as polycarbonate or other thermally insulating polymers. Suitable second materials include thermally conducting material such as aluminum or other thermally conducting metals.

In some aspects, the use of the first and second materials, with one being actively controlled, and the flow path and condenser geometry produce a thermal gradient matching the flow gradient and thus particle gradient across the cross section of the condenser. In some aspects, this allows for the condenser to be more efficient at smaller physical size.

In some aspects, the working liquid is present on the saturator surface as a thin film. In some aspects, the working liquid is a stream of working liquid. In some aspects, the working liquid is a static thin film (e.g., static other than any working liquid evaporating and/or being replenished from a reservoir).

In some aspects, the method further comprises detecting the enlarged particles using a particle counter or an optical particle counter. As described elsewhere herein, in some aspects, the enlarged particles are formed in the condenser by condensing working liquid vapor onto the particles in the sample flow. In some aspects, the particle counter is an optical particle counter. In some aspects, the optical particle counter can be any known optical particle counter. In some aspects, the detecting step is performed using at least one of scattering, extinction, interferometry, emission, or any combination thereof. In some aspects, the emission is fluorescence. In some aspects, the detecting step is performed using a combination of scattering and emission. In some aspects, the detecting step is performed using scattering and interferometry. In some aspects, the detecting step employs a Gaussian beam. In some aspects, the detecting step employs a structured beam. In some aspects, the detecting step employs a combination of a Gaussian beam and a structure beam. In some aspects, the structured beam is a dark beam (e.g., a beam comprising a spot or dark line singularity at the center of a beam profile with an otherwise typically Gaussian envelope).

In some aspects, the method increases a size of the particles for detection in a condensation nuclei particle counter. For example, in some aspects, the working liquid vapor condenses onto particles in the sample flow as the mixture of the working liquid vapor and the sample flow is passed through a condenser (e.g., operated at a cooler temperature than the saturator region).

In some aspects, disclosed herein is an apparatus or system for detecting and/or growing particles, the apparatus or system comprising:

- a saturator region comprising a saturator surface, the saturator surface configured to support a working liquid that generates a working liquid vapor, wherein the working liquid, when present, comprises a bulk working liquid having a working liquid surface exposed to the saturator region, the working liquid surface characterized by a surface area,
- a fluid inlet in fluid communication with the saturator region, the fluid inlet terminating at a nozzle configured to direct a sample flow comprising particles against and/or into the working liquid vapor to produce a mixture optionally in turbulent flow, the mixture comprising the sample flow and the working liquid vapor,
- a condenser in fluid communication with the saturator region, the condenser configured to receive and cool the mixture for condensing at least a portion of the working liquid vapor onto at least a portion of the particles, thereby forming enlarged particles,
- a fluid outlet in fluid communication with the condenser configured to receive the enlarged particles, and
- a fluidics system configured to control the surface area exposed to the saturator region by monitoring at least one of a depth of the working liquid on the saturator surface, the surface area exposed to the saturator region, or a volume of the working liquid on the saturator surface.

In some aspects, disclosed herein is apparatus or system for detecting and/or growing particles, the apparatus or system comprising:

- a vertical axis,
- a saturator region comprising a saturator surface, the saturator surface configured to support a working liquid that generates a working liquid vapor,
- a fluid inlet in fluid communication with the saturator region, the fluid inlet terminating at a nozzle, the nozzle configured to direct a sample flow comprising particles against and/or into the working liquid vapor to produce a mixture optionally in turbulent flow, the mixture comprising the sample flow and the working liquid vapor,
- a condenser in fluid communication with the saturator region, the condenser configured to receive and cool the mixture for condensing at least a portion of the working liquid vapor onto at least a portion of the particles, thereby forming enlarged particles, wherein the condenser comprises an inner wall positioned along the vertical axis and defining a central passageway, and an outer wall positioned along the vertical axis and encircling the inner wall, wherein a circumferential passageway is formed between the inner wall and the outer wall,
- a fluid outlet in fluid communication with the condenser, the fluid outlet configured to receive the enlarged particles, and
- optionally, a fluidics system,
- wherein the central passageway is in fluid communication with and positioned between the fluid inlet and the nozzle, the circumferential passageway is in fluid communication with and positioned between the saturator region and the fluid outlet, and a fluid flow path is sequentially defined by the fluid inlet, the central passageway, the nozzle, the saturator region, the circumferential passageway, and the fluid outlet,
- wherein at least a portion of the inner wall that is exposed to the circumferential passageway comprises a first material,
- wherein at least a portion of the outer wall that is exposed to the circumferential passageway comprises a second material, and wherein the first material has a lower thermal conductivity than the second material.

In some aspects, disclosed herein is an apparatus or system for detecting and/or growing particles, the apparatus or system comprising:

- a saturator region comprising a saturator surface, the saturator surface configured to support a working liquid that generates a working liquid vapor, wherein the working liquid comprises a bulk working liquid having a working liquid surface exposed to said saturator region characterized by a surface area, and wherein the saturator region does not contain, or is substantially free of, one or more porous structures that are configured to facilitate generation of the working liquid vapor;
- a fluid inlet in fluid communication with the saturator region, the fluid inlet terminating at a nozzle configured to direct a sample flow comprising particles against and/or into the working liquid vapor to produce a mixture optionally in turbulent flow, the mixture comprising the sample flow and the working liquid vapor,
- a condenser in fluid communication with the saturator region, the condenser configured to receive and cool the mixture for condensing at least a portion of the working liquid vapor onto at least a portion of the particles, thereby forming enlarged particles, and
- a fluid outlet in fluid communication with the condenser configured to receive the enlarged particles.

In some aspects, disclosed herein is an apparatus or system for detecting and/or growing particles, the apparatus or system comprising:

- a saturator region comprising a saturator surface, the saturator surface configured to support a working liquid that generates a working liquid vapor,
- a fluid inlet in fluid communication with the saturator region, the fluid inlet terminating at a nozzle configured to direct a sample flow comprising particles against and/or into the working liquid vapor to produce a mixture optionally in turbulent flow, the mixture comprising the sample flow and the working liquid vapor,
- a condenser in fluid communication with the saturator region, the condenser configured to receive and cool the mixture for condensing at least a portion of the working liquid vapor onto at least a portion of the particles, thereby forming enlarged particles, and
- a fluid outlet in fluid communication with the condenser configured to receive the enlarged particles,
- wherein the apparatus is configured to not provide a separate carrier fluid flow comprising a carrier fluid and vaporized working liquid for combining with the sample flow in the saturator region; or wherein the apparatus does not comprise an additional fluid inlet configured to introduce an additional fluid flow comprising carrier gas and a vaporized working liquid.

The apparatus or system aspects are related to, and share various features with, the method aspects disclosed elsewhere herein. As a result, the disclosures herein related to the method aspects are equally applicable to the apparatus or system aspects, and the disclosures related to the apparatus or system aspects are equally applicable to the method aspects.

In some aspects, a fluidics system is employed that is configured to control the surface area of the working liquid surface exposed to the saturator region, which control of surface area provides various advantages to a CPC apparatus. For example, controlling the surface area allows the ability to control the evaporation rate of the working liquid, the saturation level of the working liquid vapor in the saturator region, or both. Such features, in turn, allow the ability to keep the conditions within the saturator region controlled for optimized saturation of the sample flow with the working liquid vapor, affording reliable condensation of the working liquid vapor onto the particles (i.e., particle growth) in the condenser.

In some aspects, a fluidics system is employed that is configured to control the surface area (of the working liquid) exposed to the saturator region by monitoring a depth of the working liquid on the saturator surface. In some aspects, a fluidics system is employed that is configured to control the surface area exposed to the saturator region by monitoring the surface area exposed to the saturator region. In some aspects, a fluidics system is employed that is configured to control the surface area exposed to the saturator region by monitoring a volume of the working liquid on the saturator surface. In some aspects, a fluidics system is employed that is configured to control the surface area exposed to the saturator region by monitoring both the depth and the surface area. In some aspects, a fluidics system is employed that is configured to control the surface area exposed to the saturator region is achieved by monitoring both the surface area and the volume. In some aspects, a fluidics system is employed that is configured to control the surface area exposed to the saturator region by monitoring both the depth and the volume. In some aspects, a fluidics system is employed that is configured to control the surface area exposed to the saturator region by monitoring each of the depth, the surface area, and the volume.

In some aspects, the fluidics system is configured to monitor a depth of the working liquid on the saturator surface to control a surface area of the working liquid and supplying additional working liquid to maintain a target range of the surface area, detecting contamination in or degradation of the working liquid, transferring the working liquid between the saturator surface and a reservoir, heating the working liquid, or any combination thereof.

In some aspects, the fluidics system comprises a reservoir in fluid communication with the saturator surface, the reservoir configured to supply the working liquid to the saturator surface. In some aspects, a reservoir is employed and can have one or more features, such as those described herein. In some aspects, the reservoir is a solid body or a flexible wall design. In some aspects, the reservoir is equipped with a fluid level sensor array to monitor fluid level (e.g., working liquid level) in three dimensions. In some aspects, fluid level sensors provide diagnostic capability of system orientation and fluid usage rate as well as remaining fluid level. In some aspects, the reservoir is equipped with a passive combination valve when the reservoir is a rigid body design, allowing operation of fluid transport system without pressure buildup. In some aspects, flexible wall reservoir optionally employs the passive combination valve. In some aspects, the combination valve allows for fluid to be moved into and out of the reservoir and prevents leaks while in transit. In some aspects, the reservoir contains a service port allowing for a system working fluid flush during service to keep the fluid pure. In some aspects, the service valve is normally sealed closed to keep fluid contained during transport and operation, but is open via syringe activation. In some aspects, the reservoir contains appropriate connections to the fluid transport system. In some aspects, a fluid gauge provides continuous visual indication of fluid level corresponding to the fluid level sensor array. In some aspects, the work fluid liquid is in a reservoir equipped with locking Luer fittings to seal the working liquid reservoir during service and/or operation.

In some aspects, a fluid transport system is employed and can have one of more features, such as those described herein. In some aspects, the fluid transport system is operated by a micro-peristaltic pump. In some aspects, this pump is a syringe pump, a piezo pump, a metering pump, or any combination thereof. In some aspects, the fluid transport system is one or a series of pumps to move fluid between the reservoir and the saturator (e.g., saturator plate or saturator surface). In some aspects, the pump is used to move fluid between the reservoir and the saturator at a known and controlled rate. In some aspects, the control system is actively controlled by fluid level sensors, time-based, pump rate-based, or any combination thereof. In some aspects, the pump is used to maintain working liquid surface area (e.g. the surface area of the working liquid surface) to maintain consistency of instrument performance. In some aspects, the pump is used to move all fluid into the reservoir on system shut down and power loss to prevent unwanted fluid migration during transport. In some aspects, in a system powered off state the pump acts as a valve to seal the working liquid in the reservoir and further prevent unwanted fluid migration. In some aspects, the fluidics system, in conjunction with sensors and/or processors, compares the depth, volume, surface area, or any combination thereof, to one or more target ranges of the depth, volume, and/or surface area, and, in the event the depth, volume, and/or surface area is outside the respective target range, adjusting the depth, volume, and/or surface area by supplying additional working liquid from a reservoir (e.g., by way of one or more pumps, capillary action, or gravity).

In some aspects, the fluidics system comprises at least one sensor and at least one pump operably connected thereto, the at least one sensor configured to monitor the depth of the working liquid on the saturator surface, and the at least one pump configured to maintain a target depth (or volume, or surface, area, or any combination thereof) of the working liquid on the saturator surface for controlling the surface area of the working liquid by transferring working liquid from the reservoir. The at least one pump and at least one sensor are described elsewhere herein. In some aspects, the at least one pump is configured to transfer at least a portion of the working liquid from the saturator surface to the reservoir on system shutdown or, after loss of power, on power restoration. In some aspects, the pump configured to make such transfers on shutdown or after restoration of power prevent unwanted migration of the working liquid.

In some aspects, the fluidics system comprises at least one heating element integrated into or attached to the saturator surface, the reservoir if present, or a channel connecting the saturator surface and the reservoir if present, the at least one heating element configured to heat the working liquid and generate, or facilitate generation of, a working liquid vapor.

In some aspects, to facilitate evaporation of the working liquid to form the working liquid vapor, the at least one heating element increases the temperature of the working liquid. In some aspects, a heating element is not employed in the apparatus or system.

In some aspects, the fluidics system is configured to provide the working liquid on the saturator surface as a static pool, a flowing pool, a static thin film, or a flowing thin film. Whether the working liquid is static or flowing refers to the state of the working liquid on the saturator surface (stationary/static or moving), and does not refer to whether the fluidics system is moving working liquid between the reservoir (if present) and the saturator surface. A flowing pool refers to a situation where a volume of working liquid greater than necessary for a thin film is present (which comprises a bulk working liquid), and such volume is moving on the saturator surface by way of stirring or an applied force. A static pool is similar to the flowing pool, except the static pool is stationary on the saturator surface. A flowing thin film is a thin film of working liquid that is moving across the saturator surface by way of gravity or an applied force. A static thin film of working liquid is similar to a flowing thin film, except the thin film is stationary on the saturator surface. In some aspects, the working liquid comprises a static pool of working liquid and a flowing thin film of working liquid, for example, when a stream of working liquid is flowed across the saturator surface or other surface and into a pool of working liquid, or when a stream of working liquid is flowed from the pool and across the saturator surface or other surface. In some aspects, a saturator surface that has a working liquid source on one end of the surface and the working liquid flows, either via gravity by a tilt in the saturator surface or by an applied force, across the saturator surface to a working liquid outlet, a working liquid pool, or neither (e.g., the stream of working liquid evaporates as it flows and therefore is not deposited in an outlet or pool).

In some aspects, the working liquid is not present in the apparatus or system. In some aspects, the working liquid is not present on the saturator surface. In some aspects, the working liquid is present in the apparatus or system. In some aspects, the working liquid is present on the saturator surface.

In some aspects, the saturator surface is configured to support a small volume of working liquid compared to the volume of working liquid in the saturator region of traditional CPCs. For example, in some aspects, the saturator surface is configured to support (mL) 1, 2, 3, 4, 5, 6, 7, 8, 9, 10, 12, 14, 16, 18, 20, 22, 24, 26, 28, 30, 32, 34, 36, 38, 40, 42, 44, 46, 48, or 50. Each of the foregoing numbers can be preceded by the word "about," "at least," "at least about," "less than," or "less than about," and any of the foregoing numbers can be used singly to describe a single point or an open-ended range, or can be used in combination to describe multiple single points or a close-ended range. For example, in some aspects, the saturator surface is configured to support (mL) 2 to 35, 8 to 26, less than 50, or less than 30. In some aspects, the saturator surface is configured to support less than 5000 mL of working liquid.

In some aspects, the apparatus or system further comprises a plenum positioned between the condenser and the fluid outlet, the plenum configured to converge fluid flow from the circumferential passageway. In some aspects, the plenum is situated between the condenser and the particle counter, and the plenum combines flow from the condenser. In some aspects, the plenum geometry, e.g., with a shape like a cone, minimizes wall impaction of the enlarged particles.

In some aspects, the apparatus or system further comprises a particle counter in fluid communication with the fluid outlet, the particle counter for detecting the enlarged particles. In some aspects, the apparatus or system further comprises an optical particle counter in fluid communication with the fluid outlet, the optical particle counter for detecting the enlarged particles. As described elsewhere herein, in some aspects, the enlarged particles are formed in the condenser by condensing working liquid vapor onto the particles in the sample flow. In some aspects, the particle counter or optical particle counter can be any known particle counter or optical particle counter. In some aspects, the particle counter or optical particle counter detects the enlarged particles using at least one of scattering, extinction, interferometry, emission, or any combination thereof. In some aspects, the emission is fluorescence. In some aspects, the particle counter or optical particle counter detects enlarged particles using a combination of scattering and emission. In some aspects, the particle counter or optical particle counter detects enlarged particles using scattering and interferometry. In some aspects, the particle counter or optical particle counter employs a Gaussian beam. In some aspects, the particle counter or optical particle counter employs a structured beam. In some aspects, the particle counter or optical particle counter employs a combination of a Gaussian beam and a structure beam. In some aspects, the structured beam is a dark beam (e.g., comprising a spot or dark line singularity at the center of a beam profile with an otherwise typically Gaussian envelope).

In some aspects, the particle counter or optical particle counter comprises a condensation nuclei particle counter (CNC). In some aspects, any known CNC can be used.

In some aspects, the apparatus or system further comprises a docking station comprising connections for vacuum, power, data, analog input output, digital input output, an ethernet switch, or any combination thereof. In some aspects, the apparatus or system further comprises a docking station comprising connections for vacuum, power, data, analog input output, digital input output, and an ethernet switch. In some aspects, the docking station, with or without any of the aforementioned connections, further comprises an internet protocol address. In some aspects, the apparatus or system further comprises a connection for attaching the fluid outlet directly or indirectly to a vacuum system, and a flow distribution system for splitting a flow from the vacuum system into a first stream of the sample flow and a second stream for cooling components of the apparatus. In some aspects, the components to be cooled including, for example, system electronics, a laser driver, and a condenser heatsink. In some aspects, components of the apparatus are enclosed in a ventilated enclosure. In some aspects, a shroud with an integrated flow distributor covers the heatsink to provide higher levels of cooling by optimizing use of heatsink fins and increased air velocity across the heatsink.

In some aspects, the apparatus or system is configured to attach to a manifold, and the manifold is configured to supply the sample flow to the apparatus. In some aspects, the apparatus is positioned in a flow path between the manifold and a particle counter or optical particle counter.

In some aspects, the working liquid comprises a working liquid surface, and the nozzle is configured to direct the sample flow toward the working liquid surface without causing formation of bubbles of the sample flow in a bulk working liquid beneath the working liquid surface. In some aspects, the nozzle is configured to direct the sample flow into the working liquid vapor positioned in the saturator region, resulting in a mixture comprising the sample flow and the working liquid vapor. In some aspects, the resulting mixture is in turbulent flow. In some aspects, the nozzle is configured to direct a sample flow (optionally comprising particles) into the working liquid vapor and toward the working liquid surface, resulting in a mixture of the sample flow and the working liquid vapor. In some aspects, the resulting mixture is in turbulent flow. In some aspects, the nozzle is configured to direct the sample flow into the working liquid vapor and/or against the working liquid surface. In some aspects, the nozzle is configured such that the sample flow is not impinged into the working liquid. In some aspects, the nozzle is configured to direct the sample flow into the working liquid vapor and/or against the working liquid surface while causing formation of bubbles of the sample flow in the bulk working liquid beneath the working liquid surface. In some aspects, the nozzle is configured to impinge the sample flow into the working liquid.

In some aspects, the apparatus is configured to transport the sample flow along the central passageway in a manner that is parallel to, but in an opposition direction of, a fluid flow of the mixture in the circumferential passageway.

In some aspects, the condenser comprises any suitable geometry. In some aspects, the condenser comprises a tube-in-tube configuration comprising an outer wall an inner wall, and a circumferential passageway formed between the inner wall and the outer wall, as described elsewhere herein. In some aspects, a temperature of at least a portion of the outer wall that is exposed to the circumferential passageway is configured to be actively controlled, such as active cooling. In some aspects, the temperature of the portion of the outer wall and inner wall that is exposed to the circumferential passageway is cooler than the temperature of the mixture of sample flow and working liquid vapor. In some aspects, at least a portion of the inner wall that is exposed to the circumferential passageway comprises a first material, at least a portion of the outer wall that is exposed to the circumferential passageway comprises a second material, and the first material has a lower thermal conductivity than the second material. In some aspects, at least a portion of at least one of the inner wall or outer wall exposed to the circumferential passageway is comprised of a material that is a thermal insulator (e.g., thermally non-conductive). Suitable first materials include thermally insulating materials such as polycarbonate or other suitable polymer. Suitable second materials include thermally conducting materials such as aluminum or other suitable metals.

In some aspects, the condenser comprises a heatsink. In some aspects, a shroud with an integrated flow distributor covers the heatsink. In some aspects, the heatsink comprises fins.

In some aspects, the apparatus or system is configured to not provide a separate carrier fluid flow comprising a carrier fluid and vaporized working liquid for combining with the sample flow in the saturator region. In some aspects, the apparatus does not comprise an additional fluid inlet configured to introduce an additional fluid flow comprising carrier gas and a vaporized working liquid. Traditional CPCs typically employ a carrier gas comprising a working liquid vapor that is contacted with the sample flow. However, in some aspects, the methods, apparatuses, or systems disclosed herein employ working liquid on a saturator surface for generation of the working liquid vapor, and thus, in some aspects, do not require a carrier fluid to deliver the working liquid vapor to the saturator region for mixing with the sample flow. In some aspects, however, a carrier fluid can be employed in the methods, apparatuses, or systems disclosed herein to deliver the working liquid vapor to the saturator region.

In some aspects, the apparatus or system is used to grow particles having any suitable particle size prior to condensation and increase in size in a condenser, as disclosed elsewhere herein with respect to the methods.

In some aspects, the mixture in the saturator region comprises, consists of, or consists essentially of the sample flow (optionally containing particles) and the working liquid vapor. In some aspects, the mixture consists of the sample flow (optionally containing particles) and the working liquid vapor. As noted elsewhere herein, the sample flow, in some aspects, is comprised of the air of the environment to be sampled (with or without a carrier fluid and with or without entrained particles).

In some aspects, the apparatus or system is configured to flow sample flow with laminar flow or substantially laminar flow prior to entering the saturator region. In some aspects, prior to passing through the nozzle into the saturator region, the sample flow has laminar flow or substantially laminar flow. In some aspects, upon passing through the nozzle into the saturator region, the sample flow has turbulent flow. In some aspects, the sample flow has turbulent flow in the saturator region. In some aspects, the sample flow has laminar flow, or substantially laminar flow, upon entry to, or within, the condenser. In some aspects, upon entry to the saturator region the sample flow transitions from laminar flow to turbulent flow and mixes with the working liquid vapor. In some aspects, the mixture of the sample flow and working liquid vapor in turbulent flow transitions to laminar flow upon entry into the condenser. In some aspects, the sample flow has turbulent flow, or substantially turbulent flow, before entry to the saturator region, and continues to have turbulent flow in the saturator region for mixing with the working liquid vapor. In some aspects, the mixture of the sample flow and working liquid vapor in turbulent flow transitions to laminar flow upon entry into the condenser.

In some aspects, the nozzle can be any suitable nozzle. In some aspects, the nozzle comprises two or more nozzles. In some aspects, the nozzle is configured to transition the sample flow from a laminar flow prior to passing through the nozzle to a turbulent flow after passing through the nozzle. In some aspects, the nozzle acts as a jet.

In some aspects, the apparatus or system further comprises an isokinetic sampling probe. In some aspects, the apparatus or system comprises a peltier. In some aspects, the apparatus or system comprises a heatsink. In some aspects, the apparatus or system comprises an isokinetic sampling probe, a peltier, a heatsink, or any combination thereof. In some aspects, the peltier is a thermoelectric cooler, heater, or heat pump. In some embodiments, ambient air or gas is used to aid in thermal management. An embodiment, a flow of ambient air or gas is established, for example using a vacuum line, pump, blower and/or fan, and the flow of ambient air or gas is transported into thermal contact with components of the CPC to provide for heat dissipation and/or thermal management, for example of the condenser and/or saturator region. In some aspects, the apparatus or system comprises an environmental monitor.

In some aspects, the apparatus or system further comprises a cover for covering the saturator surface, which cover may be perforated or unperforated. In some aspects, the cover is positioned such that one or more gaps, in conjunction with perforations if present, allow the working liquid vapor to be in fluid communication with the saturator region.

In some aspects, the methods, apparatuses, and systems disclosed herein result in at least 90%, at least 92%, at least 94%, at least 95%, at least 96%, at least 97%, at least 98%, at least 99%, or 100% of the sample flow volume to be saturated with working liquid vapor.

Aspects of the invention can be further understood by the following non-limiting figures.

FIG. 1. depicts an aspect of a condensation particle counter, in which, during operation, a sample flow is directed perpendicular to the working liquid surface of the working liquid, if present. Apparatus or system 100 comprises saturator region 101, saturator surface 102, fluid inlet 103, fluid outlet 104, nozzle 105, and condenser 106. Although apparatus 100 is depicted without working liquid, such working liquid may be present, such as on saturator surface 102, in some aspects. During operation of apparatus or system 100 in a method for detecting and/or growing particles, working liquid is present on saturator surface 102, sample flow is flowed through fluid inlet 103, typically in laminar flow, and upon exiting nozzle 105 transitions to turbulent flow (e.g., the nozzle 105 comprising a jet). In this aspect, the nozzle 105 is configured to direct the sample flow perpendicular to the working liquid surface, and the sample flow would directly contact the working liquid surface, if present, as there are no obstacles in the path between the direction of nozzle 105 and the working liquid surface. Working liquid present on saturator surface 102 is evaporated to form a working liquid vapor in saturator region 101, and the working liquid vapor mixes with the turbulent flow of the sample flow exiting nozzle 105 (e.g., as a jet). The mixture of sample flow and working liquid vapor flows into condenser 106, wherein the mixture typically transitions to laminar flow within the condenser 106, and the working liquid vapor condenses onto the particles to form enlarged particles. The flow comprising enlarged particles then flows out of fluid outlet 104, in some aspects being fed to an optical particle counter. In this aspect, porous structures are not employed for vapor generation, and a separate carrier fluid flow comprising a carrier fluid and vaporized working liquid is not employed (e.g., by way of a separate inlet or nozzle) for combining with the sample flow in the saturator region 101.

FIG. 2. depicts an aspect of a condensation particle counter in which, during operation, a sample flow is directed in an angled fashion (i.e., not perpendicular to) toward the working liquid surface of the working liquid, if present. An optional cover 207 is depicted covering the working liquid, if present, which cover 207 may be perforated or unperforated. If unperforated (or in some aspects where perforated), the working liquid vapor is in fluid communication with saturator region 201, for example, by way of one or more gaps between cover 207 and saturator surface 202. If cover 207 is perforated, the perforations allow the working liquid vapor to pass into saturator region 201. Apparatus or system 200 comprises saturator region 201, saturator surface 202, fluid inlet 203, fluid outlet 204, nozzle 205, condenser 206, and cover 207, which may be perforated or unperforated. Although apparatus 200 is depicted without working liquid, such working liquid may be present such as on saturator surface 202, in some aspects. During operation of apparatus or system 200 in a method for detecting and/or growing particles, working liquid is present on saturator surface 202, sample flow is flowed through fluid inlet 203, typically in laminar flow, and upon exiting nozzle 205 transitions to turbulent flow (e.g., the nozzle 205 comprising a jet). In this aspect, the nozzle 205 is configured to direct the sample flow in an angled fashion toward the working liquid surface, but at least a portion of the flow of sample flow does not directly contact the working liquid surface (since any contact would be after bouncing off the cover 207 and/or walls of apparatus or system 200). Working liquid present on saturator surface 202 is evaporated to form a working liquid vapor in saturator region 201, and the working liquid vapor mixes with the turbulent flow of the sample flow exiting nozzle 205 (e.g., as a jet). The mixture of sample flow and working liquid vapor flows into condenser 206, wherein the mixture typically transitions to laminar flow within the condenser 206, and the working liquid vapor condenses onto the particles to form enlarged particles. The flow comprising enlarged particles then flows out of fluid outlet 204, in some aspects being fed to an optical particle counter. In this aspect, porous structures are not employed for vapor generation, and a separate carrier fluid flow comprising a carrier fluid and vaporized working liquid is not employed (e.g., by way of a separate inlet or nozzle) for combining with the sample flow in the saturator region 201.

FIG. 3. depicts an aspect of a condensation particle counter in which the sample flow is directed into the saturator region via two nozzles 305. The nozzles 305 are depicted to not be angled at the saturator surface 302, though one or both nozzles 305 could be angled to do so in some aspects. Apparatus or system 300 comprises saturator region 301, saturator surface 302, fluid inlet 303, fluid outlet 304, two nozzles 305, and condenser 306. Although apparatus 300 is depicted without working liquid, such working liquid may be present, such as on saturator surface 302, in some aspects. During operation of apparatus or system 300 in a method for detecting and/or growing particles, working liquid is present on saturator surface 302, sample flow is flowed through fluid inlet 303, typically in laminar flow, and upon exiting nozzles 305 (e.g., the nozzles 305 comprising jets) transitions to turbulent flow. In this aspect, the two nozzles 305 are configured to direct the sample flow into the saturator region 301, but not in a direction aimed at the working liquid surface (without first bouncing off other surfaces within the apparatus or system). Working liquid present on saturator surface 302 is evaporated to form a working liquid vapor in saturator region 301, and the working liquid vapor mixes with the turbulent flow of the sample flow exiting nozzle 305 (e.g., as a jet). The mixture of sample flow and working liquid vapor flows into condenser 306, wherein the mixture typically transitions to laminar flow within the condenser 306, and the working liquid vapor condenses onto the particles to form enlarged particles. The flow comprising enlarged particles then flows out of fluid outlet 304, in some aspects being fed to an optical particle counter. In this aspect, porous structures are not employed for vapor generation, and a separate carrier fluid flow comprising a carrier fluid and vaporized working liquid is not employed (e.g., by way of a separate inlet or nozzle) for combining with the sample flow in the saturator region 301.

FIG. 4. depicts an aspect of a condensation particle counter in which the sample flow is fed through a central passageway 408, which is in a tube-in-tube configuration with the condenser 406. Apparatus or system 400 comprises saturator region 401, saturator surface 402, fluid inlet 403, fluid outlet 404, nozzle 405, condenser 406, central passageway 408, circumferential passageway 409, vertical axis 410, and plenum 411. While the condenser is labeled as feature 406 in FIG. 4 for simplicity, technically the condenser is collectively comprised of circumferential passageway 409 and the inner and outer walls (not labeled) that define the circumferential passageway 409. In addition, although apparatus 400 is depicted without working liquid, such working liquid may be present, such as on saturator surface 402, in some aspects. During operation of apparatus or system 400 in a method for detecting and/or growing particles, working liquid is present on saturator surface 402, sample flow is flowed through fluid inlet 403 and through central passageway 408, typically in laminar flow, and upon exiting nozzle 405 transitions to turbulent flow (e.g., nozzle 405 comprises a jet). In this aspect, the nozzle 405 is configured to direct the sample flow perpendicular to the working liquid surface, and the sample flow would directly contact the working liquid surface, if present, as there are no obstacles in the path between the direction of nozzle 405 and the working liquid surface. Working liquid present on saturator surface 402 is evaporated to form a working liquid vapor in saturator region 401, and the working liquid vapor mixes with the turbulent flow of the sample flow exiting nozzle 405 (e.g., as a jet). The mixture of sample flow and working liquid vapor flows into circumferential passageway 409 formed between the wall of condenser 406 and the wall of central passageway 408, wherein the mixture typically transitions to laminar flow within the circumferential passageway 409, and the working liquid vapor condenses onto the particles to form enlarged particles. The flow comprising enlarged particles then flows out of fluid outlet 404, in some aspects being fed to an optical particle counter. In some aspects, the temperature of the wall of condenser 406 is actively controlled, e.g., actively cooled. In this aspect, porous structures are not employed for vapor generation, and a separate carrier fluid flow comprising a carrier fluid and vaporized working liquid is not employed (e.g., by way of a separate inlet or nozzle) for combining with the sample flow in the saturator region 401.

FIG. 5. depicts a further aspect of FIG. 4, in which a reservoir 512 is present for supplying working liquid to the saturator surface 502, and an optical particle counter 516 is present for receiving enlarged particles for detection and/or counting. Apparatus or system 500 comprises saturator region 501, saturator surface 502, fluid inlet 503, fluid outlet 504, nozzle 505, condenser 506, central passageway 508, circumferential passageway 509, vertical axis 510, plenum 511, reservoir 512, channel 513, bulk working liquid 514, working liquid surface 515, and optical particle counter 516. While the condenser is labeled as feature 506 in FIG. 5 for simplicity, technically the condenser is collectively comprised of circumferential passageway 509 and the inner and outer walls (not labeled) that define the circumferential passageway 509. In addition, although apparatus 500 is depicted with working liquid, such working liquid may be absent in some aspects, for example, after manufacture and shipping to an end user, but prior to operation. During operation of apparatus or system 500 in a method for detecting and/or growing particles, working liquid is present on saturator surface 502, and such working liquid comprises bulk working liquid 514 and working liquid surface 515. However, in some aspects the working liquid may be present as a film or thin film, in which case the working liquid comprises a working liquid surface but no bulk working liquid. During operation, sample flow is flowed through fluid inlet 503 and through central passageway 508, typically in laminar flow, and upon exiting nozzle 505 transitions to turbulent flow (e.g., nozzle 505 comprises a jet). In this aspect, the nozzle 505 is configured to direct the sample flow perpendicular to the working liquid surface 515, and the sample flow directly contacts the working liquid surface 515, as there are no obstacles in the path between the direction of nozzle 505 and the working liquid surface 515. Working liquid present on saturator surface 502 is evaporated to form a working liquid vapor in saturator region 501, and the working liquid vapor mixes with the turbulent flow of the sample flow exiting nozzle 505 (e.g., as a jet). The mixture of sample flow and working liquid vapor flows into circumferential passageway 509 formed between the wall of condenser 506 and the wall of central passageway 508, wherein the mixture typically transitions to laminar flow within the circumferential passageway 509, and the working liquid vapor condenses onto the particles to form enlarged particles. The flow comprising enlarged particles then flows out of fluid outlet 504 and into optical particle counter 516. In some aspects, the temperature of the wall of condenser 506 is actively controlled, e.g., actively cooled. A fluidics system is present, e.g., for controlling the surface area of the working liquid surface exposed to the saturator region, and comprises reservoir 512 and channel 513, optionally along with sensors (not depicted) that monitor the depth, surface area, volume, or any combination thereof, of the working liquid (e.g., working liquid surface 515), and optionally along with one or more pumps (not depicted) for keeping the working liquid depth or volume, or surface area of the working liquid surface 515, in a target range. Such fluidics system may also comprise one or more heating elements (not depicted) for increasing the temperature of the working liquid (e.g., the working liquid present on saturator surface 502) to facilitate generation of a working liquid vapor. In this aspect, porous structures are not employed for vapor generation, and a separate carrier fluid flow comprising a carrier fluid and vaporized working liquid is not employed (e.g., by way of a separate inlet or nozzle) for combining with the sample flow in the saturator region 501.

FIG. 6. depicts a detailed view of a tube-in-tube configuration of an aspect of a condensation particle counter. In particular, FIG. 6 is a detailed view of the tube-in-tube configuration of FIG. 4 and FIG. 5. Tube-in-tube configuration 600 comprises nozzle 605, central passageway 608, circumferential passageway 609, vertical axis 610, inner walls 620, outer walls 617, a portion 618 of inner wall 620 that is exposed to circumferential passageway 609, and a portion 619 of outer wall 617 that is exposed to circumferential passageway 609. Straight arrows depict laminar flow and curved arrows indicate turbulent flow. Flow in the central passageway 608 is parallel to, but in an opposite direction of, the flow in the circumferential passageway 609. Circumferential passageway 609, and the inner walls 620 and outer walls 617 that define the circumferential passageway 609, collectively comprise the condenser. In some aspects, the inner walls 620 and outer walls 617 have a shape about the vertical axis 610 that is circular, triangular, square, pentagonal, hexagonal, polygonal, or any combination thereof. As depicted in FIG. 6, the inner walls 620 and outer walls 617 can change diameter or shape along the vertical axis 610, such that the diameter or shape need not be uniform throughout the length of the circumferential passageway 609 or central passageway 608. During operation of the apparatus or system in a method for detecting and/or growing particles, which method employs a tube-in-tube configuration as shown in FIG. 6, sample flow is flowed through central passageway 608 in laminar flow, and upon exiting nozzle 605 transitions to turbulent flow (e.g., nozzle 605 comprises a jet). Although not depicted, after exiting nozzle 605, the sample flow mixes with working liquid vapor, and the mixture is in turbulent flow. The mixture of sample flow and working liquid vapor, which is in turbulent flow as indicated by the curved arrows, flows into circumferential passageway 609 formed between inner walls 620 and outer walls 617, wherein the mixture typically transitions to laminar flow within the circumferential passageway 609 as indicated by straight arrows. Within circumferential passageway 609, the working liquid vapor condenses onto the particles to form enlarged particles. In some aspects, inner walls 620 and outer walls 617 are made of different materials, e.g., having a different thermal conductivity. In some aspects, the temperature of outer walls 617 is actively controlled, e.g., actively cooled or heated. In some aspects, the temperature of inner walls 620 is actively controlled, e.g., actively cooled or heated. In some aspects, the temperature of both inner 620 and outer 617 walls is actively controlled. In some aspects, inner walls 620 comprise a thermal insulator (e.g., a thermally nonconductive material).

Figure 7:
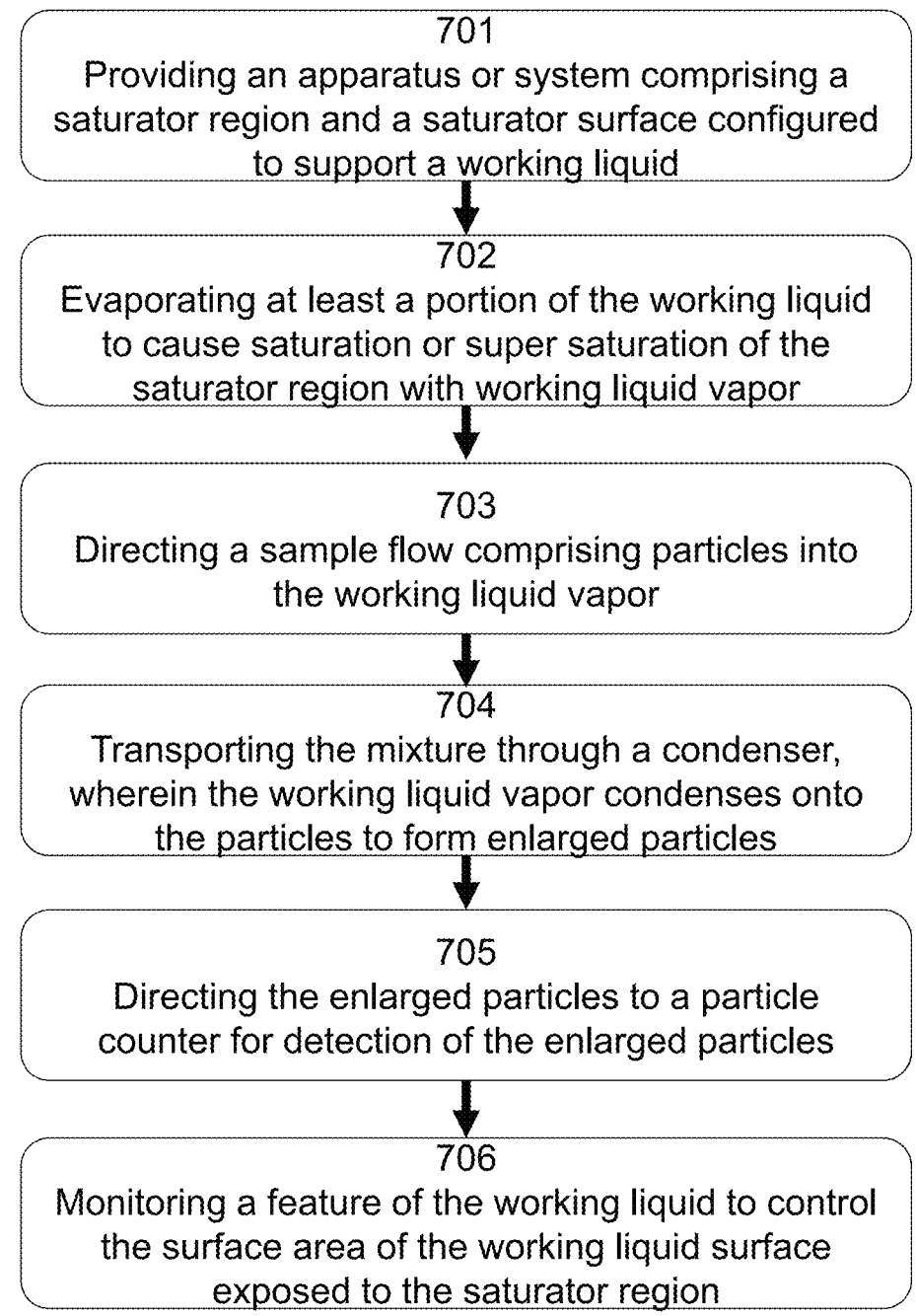
FIG. 7. depicts a flow diagram of an aspect of a method for detecting and/or growing particles.

FIG. 7. depicts a flow diagram 700 of an aspect of a method for detecting and/or growing particles. In this aspect, the method comprises a step 701 of providing an apparatus or system comprising a saturator region and a saturator surface configured to support a working liquid, a step 702 of evaporating at least a portion of the working liquid to cause saturation or super saturation of the saturator region with working liquid vapor, a step 703 of directing a sample flow comprising particles into the working liquid vapor, a step 704 of transporting the mixture through a condenser, wherein the working liquid vapor condenses onto the particles to form enlarged particles, a step 705 of directing the enlarged particles to a particle counter (e.g. optical particle counter) for detection of the enlarged particles, and a step 706 of monitoring a feature of the working liquid to control the surface area of the working liquid surface exposed to the saturator region, in which the feature that is monitored is at least one of a depth of the working liquid on the saturator surface, the surface area exposed to the saturator region, or a volume of the working liquid on the saturator surface. Any of these steps may be excluded or arranged in a different order, and/or additional steps may be added.

Figure 8:
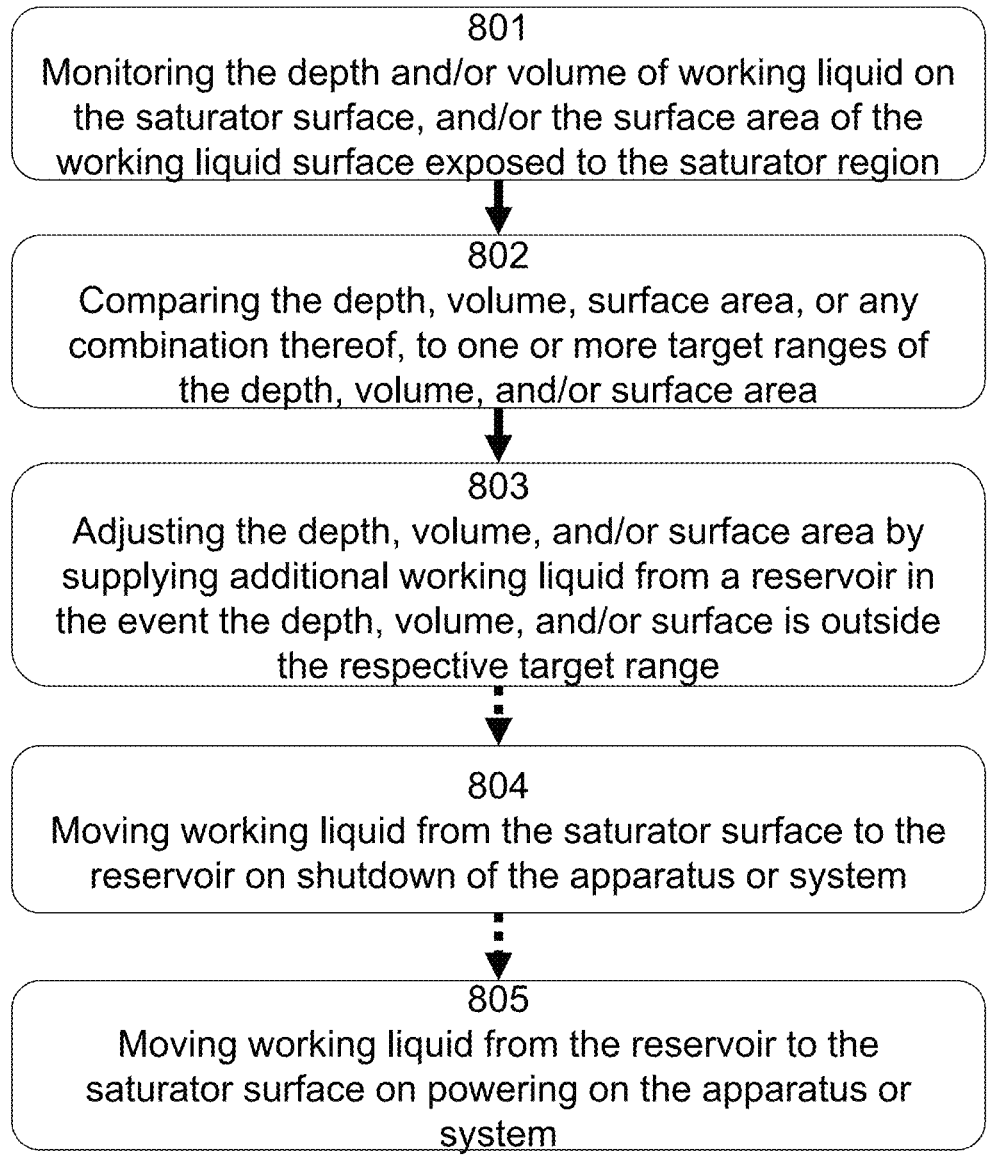
FIG. 8. depicts a flow diagram of an aspect of controlling the surface area of the working liquid.

FIG. 8. depicts a flow diagram of an aspect of controlling the surface area of the working liquid surface exposed to the saturator region of an apparatus or system disclosed herein. In this aspect, controlling the surface area comprises a step 801 of monitoring the depth and/or volume of working liquid on the saturator surface, and/or the surface area of the working liquid surface exposed to the saturator region, a step 802 of comparing the depth, volume, surface area, or any combination thereof, to one or more target ranges of the depth, volume, and/or surface area, a step 803 of, in the event the depth, volume, and/or surface area is outside the respective target range, adjusting the depth, volume, and/or surface area by supplying additional working liquid from a reservoir (e.g., by way of one or more pumps, capillary action, or gravity), a step 804 of moving working liquid from the saturator surface to the reservoir on shutdown of the apparatus or system, and a step 805 of moving working liquid from the reservoir to the saturator surface on powering on the system or apparatus. Dashed arrows indicate explicitly optional steps, however, any step depicted or described in FIG. 8 may be excluded or arranged in a different order, and/or additional steps may be added.

EXAMPLES

Aspects of the invention can be further understood by the following non-limiting examples.

Example 1: Compact Wickless Turbulently Mixed Thermal Diffusion Condensation Particle Counter This example demonstrates some aspects of a condensation particle counter (CPC), in particular, a compact wickless turbulently mixed thermal diffusion CPC.

A compact wickless turbulently mixed thermal diffusion CPC is an apparatus for detecting particles in an aerosol fluid stream. The aerosol sample stream is turbulently mixed with a saturated working liquid vapor before quickly transitioning to a laminar flow thermal diffusion condensation growth region. The inlet aerosol sample stream is perpendicular in direction to the surface of the working liquid. The condensation flow stream comprising the aerosol sample flow and the saturated working liquid vapor is flowing parallel to, but in the opposite direction of, the inlet aerosol sample stream.

The compact wickless turbulently mixed thermal diffusion condensation particle counter described in this aspect solves the need for a particle counter capable of detecting sub-10 nm particles that is compact, inexpensive, and robust enough for application inside of a semiconductor process tool.

In some aspects, a compact wickless turbulently mixed thermal diffusion condensation particle counter can be equipped with a docking station that slides into a manifold and is a common component between the manifold and the CPC. In some aspects, the docking station contains IP address and one or more user connections (e.g., data, analog input output, digital input output, ethernet switch, vacuum, power, or any combination thereof). A docking station allows for fast service interval, swapping of different units with as minimal user interaction as possible.

Additional aspects of a compact wickless turbulently mixed thermal diffusion condensation particle counter could include a removable and replaceable working liquid container. This removable and replaceable working liquid container can constitute up to the entire fluidics assemble including, but not limited to, the saturator, a working liquid reservoir, a working liquid reservoir, fluid level sensors, fluid level status indication, and working liquid transport pump.

Implementation of the apparatuses, systems, or methods described herein, including those described in Example 1, addresses various issues suffered by known CPC instrumentation, as described elsewhere herein.

CPC System Components

In some aspects of the CPC described in this example, the CPC system components include a reservoir, a fluid transport system, a saturator, a condenser, a plenum, a particle counter, a thermal management system, a sample flow monitor, a docking station, and an environmental monitor.

Figure 9:
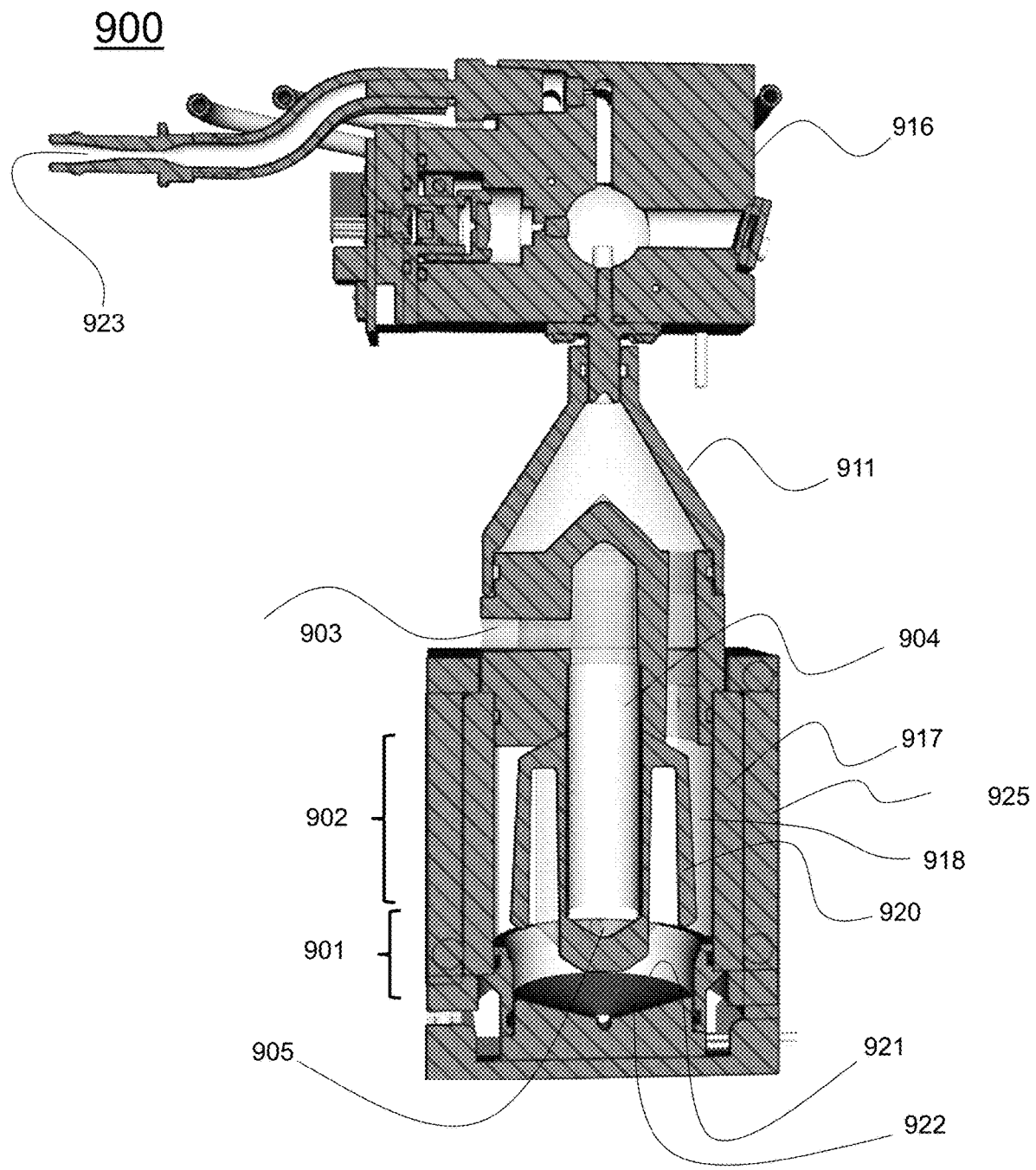
FIG. 9. provides a cross sectional side view of a condensation particle counter (CPC) comprising saturator region and condenser provided in a tube-in-tube geometry for providing saturation and condensation conditions for enlarging particles in a sample flow.

FIG. 9. provides a cross sectional side view of a condensation particle counter (CPC) comprising saturator region 901 and condenser 902 provided in a tube-in-tube geometry for providing saturation and condensation conditions for enlarging particles in a sample flow. Also shown in FIG. 9 is particle counter 916, which can be an optical particle counter, for receiving and detecting and counting enlarged particles from the condenser 902.

As shown in FIG. 9, sample flow enters the CPC via sample inlet 903 and is transported via central passageway 904 to saturator region 901 having working liquid provided on saturator surface 921 of a saturator plate 922, wherein the saturator surface 921 is configured to support the working liquid that generates working liquid vapor in the saturator region 901. The working liquid comprises a bulk working liquid having a working liquid surface exposed to the sample flow in the saturator region 901, the working liquid surface characterized by a surface area. The fluid inlet 903 is in fluid communication with saturator region 901 via the central passageway 904, which terminates at a nozzle 905 configured to direct a sample flow comprising particles into the working liquid vapor, and/or toward or on to the surface of working liquid provided on saturator surface 921 of saturator plate 922, thereby generating a mixture in turbulent flow, the mixture comprising working liquid vapor and the sample flow. In some aspects, the working liquid provided on saturator surface 921 of saturator plate 922 is fluidically monitored and/or controlled, for example, to present a substantially constant surface (e.g., substantially constant surface area exposed to the sample flow) of working liquid to the sample flow. In such aspects, a fluidics system (not depicted in FIG. 9) is employed that is configured to control the surface area of the working liquid exposed to the saturator region 901 by monitoring at least one of a depth of the working liquid on the saturator surface 921, the surface area exposed to the saturator region 901, or a volume of the working liquid on the saturator surface 921.

Condenser 902 is in fluid communication with saturator region 901 and configured to receive and cool the mixture of sample flow and working liquid vapor for condensing at least a portion of the working liquid vapor onto at least a portion of the particles, thereby forming enlarged particles. Condenser 902 has an inner wall 920 positioned along a vertical axis and defining the central passageway 904, an outer wall 917 positioned along the vertical axis and encircling the inner wall 920, and insulation 925 for facilitating temperature control the condenser 902. A circumferential passageway 918 is formed between the inner wall 920 and the outer wall 917, and the mixture of sample flow and working liquid vapor is cooled within this circumferential passageway 918. The cooling within the circumferential passageway 918 results in at least a portion of the working liquid vapor condensing onto at least a portion of the particles in the mixture, thereby forming enlarged particles. Cooling of the condenser may be achieved by a variety of active and passive cooling structure and devices known in the art including air cooling, thermoelectric cooling, liquid cooling, use of heat sinks, use of heat pipes and the like. A plenum 911 is configured to receive the cooled mixture of the sample flow and the working liquid vapor from the condenser 902. The cooled mixture comprising enlarged particles is directed the particle counter 916 and out of the system 900 through the flow control orifice 923. Fluid actuation may be achieved by an actuator as known in the art, such as one or more pump, blower, fan, house vacuum line or the like.

Figure 10:
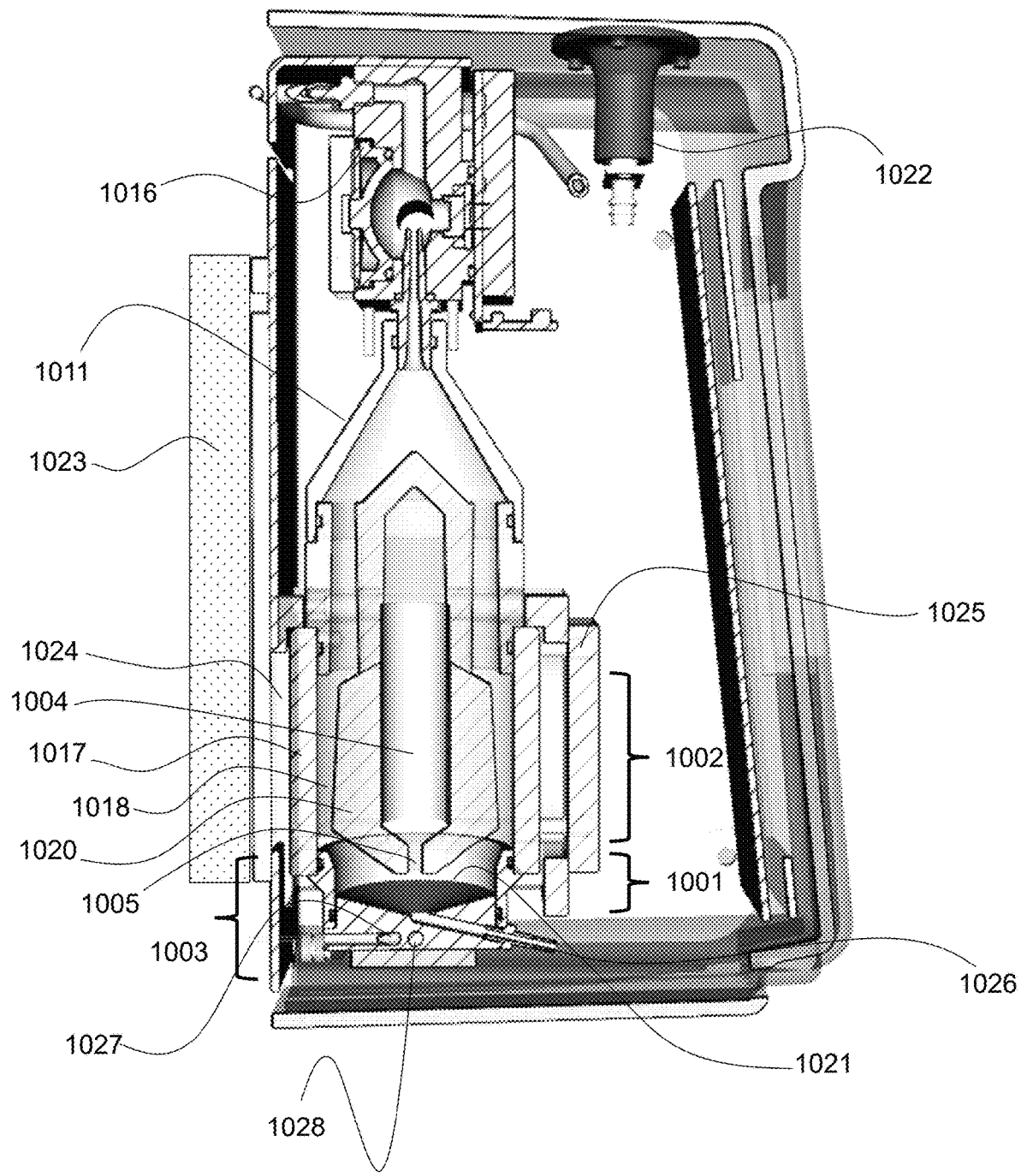
FIG. 10. provides a side perspective view of an apparatus or system comprising a condensation particle counter (CPC).

FIG. 10. provides a side perspective view of a components 1000 of the condensation particle counter (CPC). The CPC comprises a saturator region 1001, a condenser 1002 with a tube-in-tube geometry having an inner wall 1020 and outer wall 1017, a heatsink 1023, a peltier 1024, isokinetic sampling probe 1022, and further details of the fluidics system, which fluidics systems comprises temperature probe 1027, heating element 1028, and fluid interface 1026.

As shown in FIG. 10, the CPC comprises a saturator plate (not depicted) comprising a saturator surface 1021 configured to support a working liquid that generates a working liquid vapor in saturator region 1001. A sample flow comprising particles is directed through a fluid inlet (not depicted) into central passageway 1004 and into the working liquid vapor positioned in the saturator region 1001, resulting in a mixture in turbulent flow comprising the sample flow and the working liquid vapor. The mixture is transported through the condenser 1002 in which at least a portion of the working liquid vapor condenses onto at least a portion of the particles of the sample flow and increases the size of the particles of the sample flow, thereby generating enlarged particles. Such condensation takes place within circumferential passageway 1018, which is formed between inner wall 1020 and outer wall 1017. The cooling action within condenser 1002 is facilitated by peltier 1024, which cools condenser outer wall 1017, and heatsink 1023, which in turn acts as a sink for heat derived from peltier 1024. Insulation 1025 facilitates temperature control of the condenser 1002. The cooled mixture comprising sample flow, working liquid vapor, and enlarged particles is directed to particle counter 1016 via plenum 1011.

Components 1000 further comprises a fluidics system for controlling the surface area of the working liquid exposed to the saturator region 1001, the fluidics system 103 comprising a temperature probe 1027 for monitoring the temperature of the working liquid and/or the saturator surface 1021, a heating element 1028 for controlling the temperature of the working liquid and/or the saturator surface (or other components of the fluidics system in contact with the working liquid), and a fluid interface 1026 for connecting the working liquid on the saturator surface 1021 with a reservoir (not depicted) of the working liquid so as to provide working liquid to or withdraw working liquid from the saturator surface 1021. The fluidics system can also comprise one or more sensors (not depicted) for monitoring at least one of a depth of the working liquid on the saturator surface 1021, the surface area exposed to the saturator region 1001, or a volume of the working liquid on the saturator surface 1021. The fluidics system can also comprise one or more valves, fluid actuators, pumps, sensors, channels, etc. By controlling the surface area of the working liquid surface exposed to the saturator region 1001, the appropriate saturation of working liquid in the saturator region 1001 can be precisely achieved.

Figure 11:
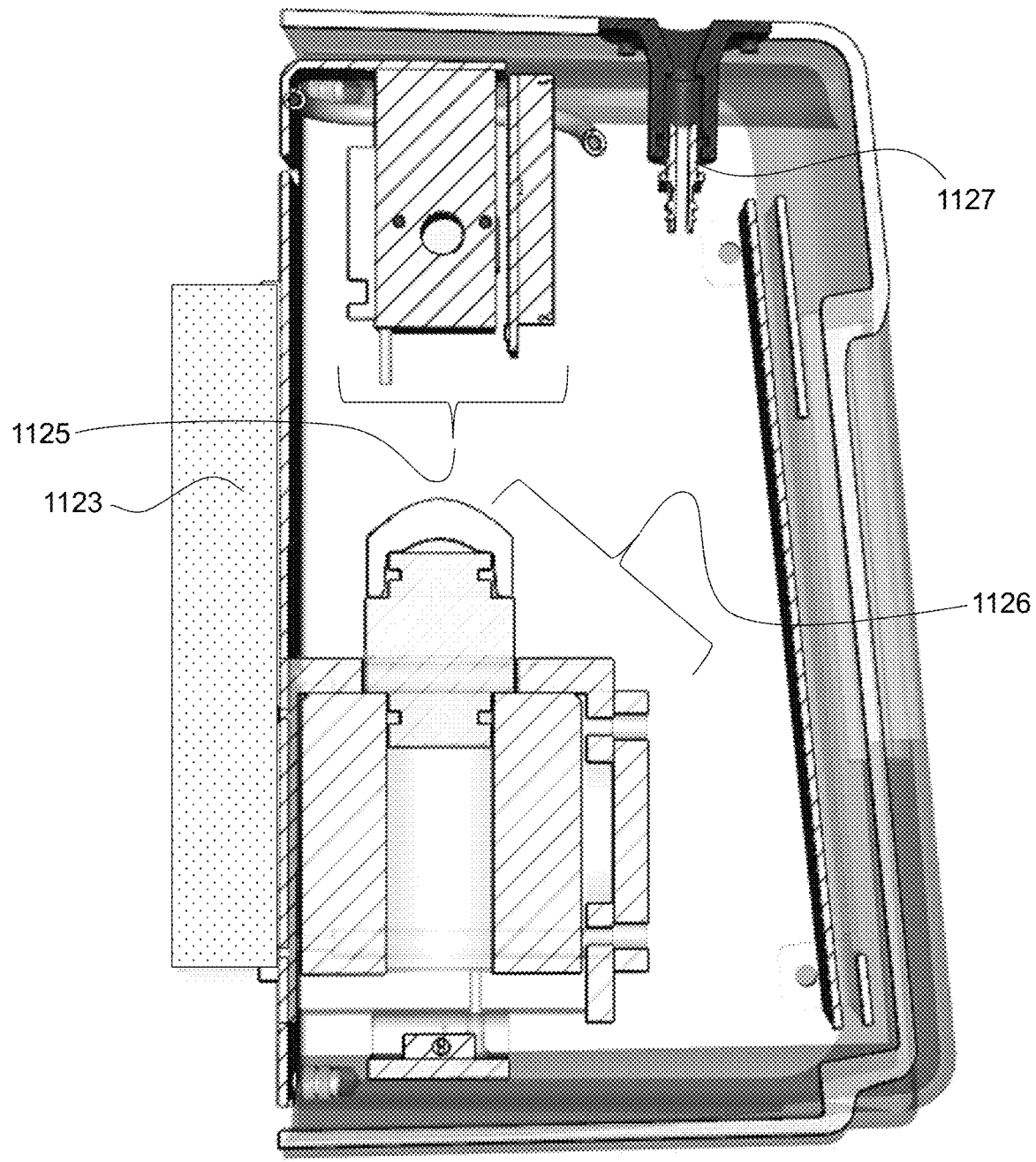
FIG. 11. provides a side perspective view of an apparatus for mounting a condensation particle counter system.
Figure 12:
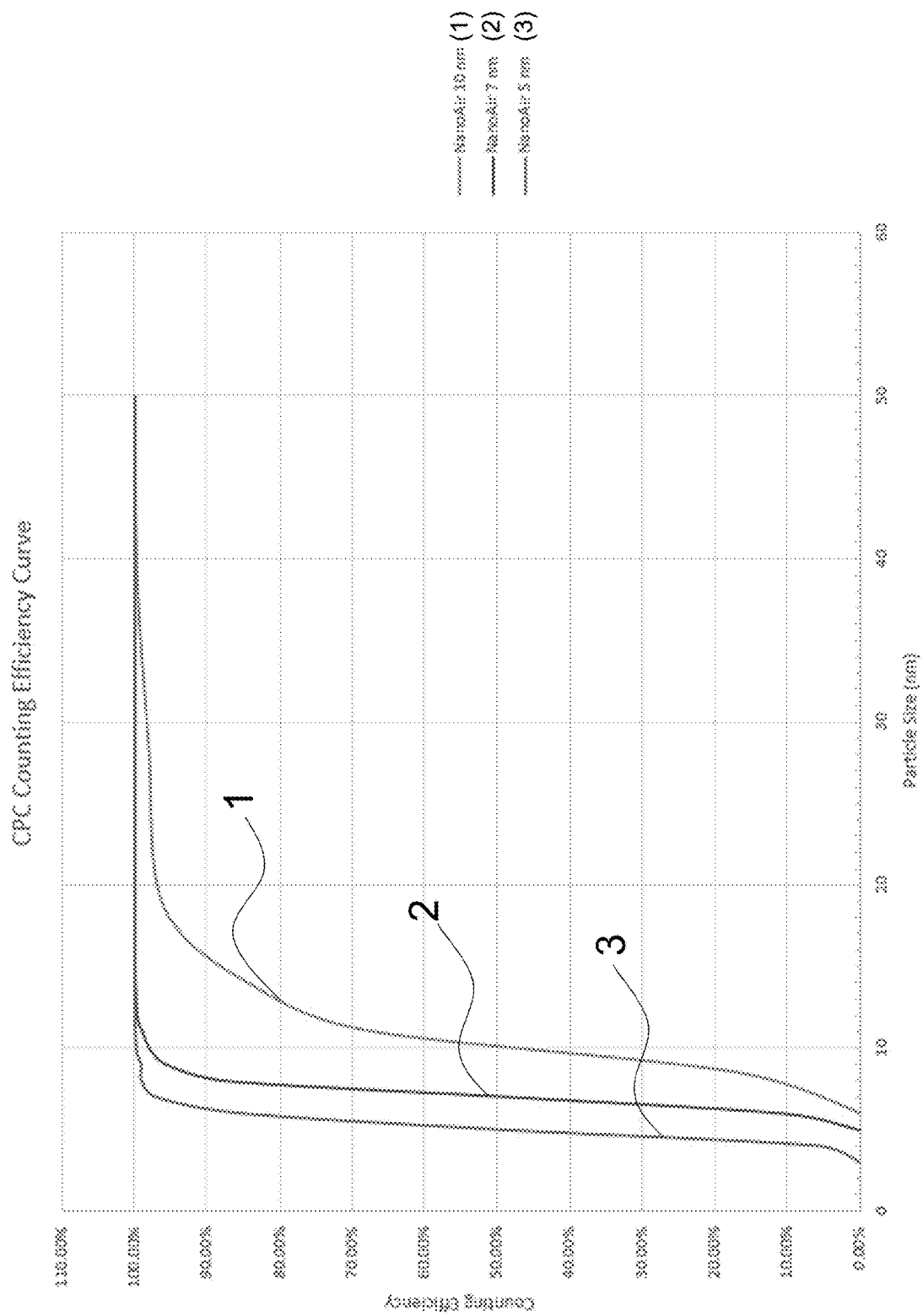
FIG. 12 provides a plot showing the size dependent particle counting efficiency curves for systems targeted at 10 nm (1), 7 nm (2) and 5 nm (3) particles.

FIG. 11. provides a side perspective view of components for mounting a condensation particle counter system. components 1100 comprises heatsink 1123, mount 1125 for an apparatus or system for detecting and/or growing particles, mount 1126 for a particle counter, and mount 1127 for an isokinetic sampling probe.

CPC System Flow Path

Sample Flow Path—Sample flow is introduced into the system in an orientation perpendicular to the saturator and working liquid surface (e.g., working liquid surface). However, other orientations are possible and contemplated herein. Sample flow is also orientated parallel to the condenser flow path, though other orientations are possible and contemplated herein. Sample flow has laminar flow through the sample inlet. Upon entering the saturator area (e.g., saturator region) above the working liquid (e.g., working liquid), the sample flow transitions to a turbulent flow area through the use of a jet (e.g., nozzle) on the end of the inlet situation above the working liquid pool (e.g., working liquid) on the saturator (e.g., saturator surface or saturator plate). The turbulent flow area provides sufficient time to add vaporized working liquid (e.g., working liquid vapor) to the sample flow. The turbulent flow area provides sufficient mixing of vaporized working liquid (e.g., working liquid vapor) and sample flow to achieve uniform mixing. Both the mixing and additional vapor collection time from the turbulent flow area allow usage of higher flow rate systems up to 15 Liters per minute sample flow rate has been achieved. The turbulent flow area allows for 100% of sample volume to be saturated and sampled. The sample flow laden with working liquid vapor (e.g., working liquid vapor) enters the condenser section transitioning from the turbulent flow area (e.g., saturator region) above the saturator to a laminar flow in the condenser. The concentric flow area in the condenser is combined in a plenum situated between the condenser and the particle counter. The plenum geometry is such that wall impaction of the enlarged particles is minimized. The sample flow containing enlarged particles flows through the particle counter, through a flow sensor and out to the house vacuum system.

CPC System Features

Propylene Glycol Working liquid—In some aspects, propylene glycol is a suitable working liquid (e.g., working liquid) for one or more reasons, including at least one of: (1) a low saturated vapor pressure for long fluid life, (2) non-toxic, (3) colorless, (4) odorless, (5) non-VOC producing, (6) high saturation ratios achievable through the low vapor pressure for faster growth, (7) less fluid usage leads to more robust design through lower probability of fluid migration to optics, (8) lower volatility leads to less false counts through condensation onto fluid molecules, (9) requires less frequent servicing to refill the working liquid or any combination thereof.

Condenser Geometry—In some aspects, a tube-in-tube structure is chosen as a suitable geometry for the condenser for one or more reasons, including at least one of (1) this geometry has little to no edge effects, (2) a high (or the highest) efficiency condensation ratio, (3) a more compact design, or (4) larger volume flows since area can be expanded indefinitely without changing the condensation ratio.

Wickless Saturator Design (milli-pooled saturator)—In this example, a wickless saturator design is employed, representing an improvement of the traditional pooled saturator CPC design. One advantage to the improved saturator design of this example is in heating only a small amount of the total fluid (e.g., working liquid) at any given time, which allows for better and more consistent control of fluid (e.g., working liquid) temperature and ultimately more consistent instrument performance. Heating a small amount of fluid (e.g., working liquid) and exposing only a small amount of the fluid (e.g., working liquid) to the sample flow provides less contamination and degradation of fluid (e.g., working liquid) allowing for longer fluid (e.g., working liquid) life with equivalent performance. The fluid level (e.g., working liquid level) can be monitored and controlled to give consistent performance by maintaining the same or similar available surface area of working liquid (e.g., working liquid) for vapor formation (e.g., working liquid vapor formation), the same amount of vapor interaction with the sample flow, and the same (or similar) and minimized thermal gradient across the active working liquid. In some aspects, it is advantageous to not employ a wick structure for one or more reasons, including at least one of (1) preventing shedding that would produce false counts, (2) less particle loss since no interaction with a porous media, (3) higher flow rates since no restriction from flow through a porous media, or (4) any combination thereof.

Reservoir—In some aspects, a reservoir is employed and can have one or more features, such as those described herein. The reservoir is a solid body or a flexible wall design. The reservoir is equipped with a fluid level sensor array to monitor fluid level (e.g., working liquid level) in three dimensions. Fluid level sensors provides diagnostic capability of system orientation and fluid usage rate as well as remaining fluid level. The reservoir is equipped with a passive combination valve when the reservoir is a rigid body design, allowing operation of fluid transport system without pressure buildup. Flexible wall reservoir optionally employs the passive combination valve. The combination valve allows for fluid to be moved into and out of the reservoir and prevents leaks while in transit. The reservoir contains a service port allowing for a system working fluid flush during service to keep the fluid pure. The service valve is normally sealed closed to keep fluid contained during transport and operation, but is open via syringe activation. The reservoir contains appropriate connections to the fluid transport system. A fluid gauge provides continuous visual indication of fluid level corresponding to the fluid level sensor array.

Fluid Transport System—In some aspects, a fluid transport system is employed and can have one of more features, such as those described herein. The fluid transport system is operated by a fluidic pump. This pump is a micro-peristaltic pump, a syringe pump, a piezo pump, a metering pump, etc. This pump is a syringe pump, a piezo pump, a metering pump, etc. The fluid transport system is one or a series of pumps to move fluid between the reservoir and the saturator (e.g., saturator plate or saturator surface). The pump is used to move fluid between the reservoir and the saturator at a known and controlled rate. The control system is actively controlled by fluid level sensors, time-based, pump rate-based, or any combination thereof. The pump is used to maintain working liquid surface area (e.g. the surface area of the working liquid surface) to maintain consistency of instrument performance. The pump is used to move all fluid into the reservoir on system shut down and power loss to prevent unwanted fluid migration during transport. In a system powered off state the pump acts as a valve to seal the working liquid in the reservoir and further prevent unwanted fluid migration.

Dual Condenser Material Usage—In some aspects, the condenser is characterized by certain features. The material on the inside direction of the flow path of the condenser (e.g., the inner wall that is exposed to the circumferential passageway) is a different material to the outside direction of the flow path (e.g., the outer wall that is exposed to the circumferential passageway). The outside flow path condenser temperature is actively controlled. The inside flow path condenser material is a thermally non-conductive material. The use of the two materials, with one being actively controlled, and the flow path and condenser geometry produce a thermal gradient matching the flow gradient and thus particle gradient across the cross section of the condenser. This allows for the condenser to be more efficient at smaller physical size.

House Vacuum and Thermal Management System—In some aspects, a house vacuum and/or thermal management system is employed. The house vacuum system is being utilized to provide both flow through the particle counter as well as cool components for optimal system performance. A house vacuum distribution system is housed inside the instrument to split and control the flow rate of the house vacuum for its different intended uses. A flow control element is used to create desired volume flow rates for component cooling as well as sample flow rate particle counting. For thermal management, the room air is pulled across the system electronics, laser driver, and condenser heatsink. A ventilated enclosure is used to focus the flow drawn from the room air across the desired components inside the system. A shroud with an integrated flow distributor covers the heatsink to provide higher levels of cooling by optimizing use of heatsink fins and increase air velocity across the heatsink.

Docking Station—In some aspects, a docking station is employed. The docking station slides into the manifold and is a common component between the manifold and the CPC. The docking station contains an IP address and one or more user connections (e.g., data, analog input output, digital input output, ethernet switch, vacuum, power, or any combination thereof, including all components). The docking station allows for fast service interval and swapping of different units with as minimal user interaction as possible.

Diagnostics—In some aspects, diagnostics are performed on the particles. Particle counter signal fed to a field-programmable gate array (FPGA) to be utilized as a pulse height analyzer (PHA) for potential analysis of one or more of: (1) particle growth (overall system health) both on an individual particle event and historical for trend monitoring, (2) system flow rate, (3) sample particulate charge and material, (4) fluid contamination, (5) fluid degradation, or (6) any combination thereof. A fluid level sensor from both reservoir and saturator is employed for potential analysis of at least one of (1) fluid contamination, (2) fluid degradation, (3) system orientation, (4) remaining operating time, (5) rate of fluid usage for health of system, or (6) any combination thereof. Environmental Sensors are employed for potential analysis of at least one of: (1) changes in operational set points to maintain performance, (2) system self-protection in case of extreme environment, or (3) a combination thereof.

Certain features relating to some aspects of Example 1 or aspects disclosed elsewhere herein are disclosed in U.S. Pat. No. 8,869,593, hereby incorporated by reference in its entirety for all purposes.

Example 2: Counting Efficiency of a Compact Wickless Turbulently Mixed Thermal Diffusion Condensation Particle Counter This example demonstrates some aspects of a condensation particle counter (CPC), in particular, a counting efficiency curve of a compact wickless turbulently mixed thermal diffusion CPC.

A CPC as depicted in FIGS. 4, 9, and 10 was employed using propylene glycol as the working liquid. A sample flow was passed through the apparatus or system forming enlarged particles, and the particles passed to an optical particle counter. FIG. 12 provides a plot showing the size dependent particle counting efficiency curves for systems targeted at 10 nm (1), 7 nm (2) and 5 nm (3) particles.

Additional aspects include:

Aspect 1. A method for detecting and/or growing particles, comprising:

- providing an apparatus comprising a working liquid and a saturator region, wherein the working liquid comprises a bulk working liquid having a working liquid surface exposed to the saturator region, the working liquid surface characterized by a surface area, and the working liquid is positioned on a saturator surface in the saturator region,
- evaporating at least a portion of the working liquid to form a working liquid vapor,
- directing a sample flow comprising particles into the working liquid vapor positioned in the saturator region, resulting in a mixture comprising the sample flow and the working liquid vapor, wherein the mixture is in turbulent flow,
- transporting the mixture through a condenser and cooling the mixture therein, wherein at least a portion of the working liquid vapor condenses on at least a portion of the particles of the sample flow and increases the size of the particles of the sample flow,
- directing the enlarged particles to an particle counter, such as an optical particle counter, and
- controlling the surface area exposed to the saturator region by monitoring at least one of a depth of the working liquid on the saturator surface, the surface area exposed to the saturator region, or a volume of the working liquid on the saturator surface.

Aspect 2. The method of aspect 1, further comprising supplying additional working liquid to maintain a target range of the surface area, wherein the target range of the surface area is 0.01 to 500 $cm^2$.

Aspect 3. The method of aspect 1 or aspect 2, further comprising supplying additional working liquid to maintain a target range of the depth, wherein the target range of the depth is 0.001 to 100 mm.

Aspect 4. The method of any one of aspects 1-3, further comprising supplying additional working liquid to maintain a target range of the volume, wherein the target range of the volume is 0.001 to 5000 mL.

Aspect 5. A method for detecting and/or growing particles, comprising:

- providing an apparatus comprising a working liquid and a saturator region, wherein the working liquid comprises a bulk working liquid having a working liquid surface exposed to the saturator region characterized by a surface area, and the working liquid is positioned on a saturator surface in the saturator region,
- evaporating at least a portion of the working liquid to form a working liquid vapor,
- directing a sample flow comprising particles into the working liquid vapor and toward the working liquid surface, resulting in a mixture of the sample flow and the working liquid vapor, wherein the mixture is in turbulent flow, and
- transporting the mixture through a condenser and cooling the mixture therein, wherein at least a portion of the working liquid vapor condenses on at least a portion of the particles of the sample flow and increases the size of the particles of the sample flow, and
- directing the enlarged particles to an particle counter, such as an optical particle counter.

Aspect 6. The method of any preceding aspect, wherein the working liquid comprises a pool of working liquid or a stream of working liquid.

Aspect 7. The method of any preceding aspect, wherein the directing step causes the sample flow to travel into the working liquid vapor and/or against the working liquid surface without causing formation of bubbles of the sample flow in the bulk working liquid beneath the working liquid surface.

Aspect 8. The method of any preceding aspect, wherein the working liquid surface comprises a continuous plane configured in an orientation perpendicular or non-perpendicular to a direction of gravity.

Aspect 9. The method of any preceding aspect, wherein the mixture consists of the sample flow and the working liquid vapor.

Aspect 10. The method of any preceding aspect, wherein the working liquid vapor is in contact with the working liquid surface.

Aspect 11. The method of any preceding aspect, wherein the evaporating step is substantially free of, or does not employ, one or more porous structures configured to facilitate generation of the working liquid vapor.

Aspect 12. The method of any preceding aspect, wherein the working liquid vapor is not delivered to the saturator region by a carrier gas comprising the working liquid vapor.

Aspect 13. The method of any preceding aspect, wherein the sample flow propagates through the apparatus at a flow rate of at least 0.1 L/min.

Aspect 14. The method of any preceding aspect, wherein the working liquid comprises propylene glycol, water, isobutanol, n-butanol, sec-butanol, tert-butanol, isopropanol, 1-propanol, dimethyl phthalate, dioctyl phthalate, dimethylsulphoxide, or any combination thereof.

Aspect 15. The method of any preceding aspect, wherein the working liquid has a dynamic viscosity of 0.0001 to 1.0 Ns/m$^2$, a boiling point of 80° C. to 230° C., a specific gravity of 0.8 to 2.0 g/mL, or any combination thereof.

Aspect 16. The method of any preceding aspect, wherein the sample flow has substantially laminar flow prior to the directing step and during the transporting step.

Aspect 17. The method of any preceding aspect, wherein a manifold is connected to the apparatus to supply the sample flow and wherein a docking station is provided comprising connections for vacuum, power, data, analog input output, digital input output, an ethernet switch, or any combination thereof.

Aspect 18. The method of any preceding aspect, wherein the condenser comprises an inner wall positioned along a vertical axis of the apparatus and defining a central passageway, and an outer wall positioned along the vertical axis and encircling the inner wall, wherein a circumferential passageway is formed between the inner wall and the outer wall,
- at least a portion of the inner wall that is exposed to the circumferential passageway comprises a first material,
- at least a portion of the outer wall that is exposed to the circumferential passageway comprises a second material, and
- the first material has a lower thermal conductivity than the second material, and
- the method further comprises cooling at least a portion of the outer wall that is exposed to the circumferential passageway and flowing the sample flow through the central passageway to the directing step,
- wherein the transporting is performed in the circumferential passageway, and the flowing is parallel to, but in an opposite direction of, the transporting.

Aspect 19. The method of any preceding aspect, wherein the working liquid is present as a thin film.

Aspect 20. The method of any preceding aspect, further comprising detecting the enlarged particles using the optical particle counter.

Aspect 21. The method of aspect 20, or any preceding aspect, wherein the detecting step is performed using at least one of scattering, extinction, interferometry, emission, or any combination thereof.

Aspect 22. The method of aspect 20 or aspect 21, or any preceding aspect, wherein the method increases a size of the particles for detection in a condensation nuclei particle counter.

Aspect 23. An apparatus for detecting and/or growing particles, comprising:
- a saturator region comprising a saturator surface, the saturator surface configured to support a working liquid that generates a working liquid vapor, wherein the working liquid, when present, comprises a bulk working liquid having a working liquid surface exposed to the saturator region, the working liquid surface characterized by a surface area,
- a fluid inlet in fluid communication with the saturator region, the fluid inlet terminating at a nozzle configured to direct a sample flow comprising particles against and/or into the working liquid vapor to produce a mixture in turbulent flow, the mixture comprising the sample flow and the working liquid vapor,
- a condenser in fluid communication with the saturator region, the condenser configured to receive and cool the mixture for condensing at least a portion of the working liquid vapor onto at least a portion of the particles, thereby forming enlarged particles,
- a fluid outlet in fluid communication with the condenser configured to receive the enlarged particles, and
- a fluidics system configured to control the surface area exposed to the saturator region by monitoring at least one of a depth of the working liquid on the saturator surface, the surface area exposed to the saturator region, or a volume of the working liquid on the saturator surface.

Aspect 24. The apparatus of aspect 23, or any preceding aspect, wherein the fluidics system is configured to supply additional working liquid to maintain a target range of the surface area, wherein the target range of the surface area is 0.01 to 500 $cm^2$.

Aspect 25. The apparatus of aspect 23 or aspect 24, or any preceding aspect, wherein the fluidics system is configured to supply additional working liquid to maintain a target range of the depth, wherein the depth is 0.001 to 100 mm.

Aspect 26. The apparatus of any one of aspects 23-25, or any preceding aspect, wherein the fluidics system is configured to supply additional working liquid to maintain a target range of the volume, wherein the volume is 0.001 to 5000 mL.

Aspect 27. An apparatus for detecting and/or growing particles, comprising:

- a vertical axis,
- a saturator region comprising a saturator surface, the saturator surface configured to support a working liquid that generates a working liquid vapor,
- a fluid inlet in fluid communication with the saturator region, the fluid inlet terminating at a nozzle, the nozzle configured to direct a sample flow comprising particles against and/or into the working liquid vapor to produce a mixture in turbulent flow, the mixture comprising the sample flow and the working liquid vapor,
- a condenser in fluid communication with the saturator region, the condenser configured to receive and cool the mixture for condensing at least a portion of the working liquid vapor onto at least a portion of the particles, thereby forming enlarged particles, wherein the condenser comprises an inner wall positioned along the vertical axis and defining a central passageway, and an outer wall positioned along the vertical axis and encircling the inner wall, wherein a circumferential passageway is formed between the inner wall and the outer wall,
- a fluid outlet in fluid communication with the condenser, the fluid outlet configured to receive the enlarged particles, and
- optionally, a fluidics system,
- wherein the central passageway is in fluid communication with and positioned between the fluid inlet and the nozzle, the circumferential passageway is in fluid communication with and positioned between the saturator region and the fluid outlet, and a fluid flow path is sequentially defined by the fluid inlet, the central passageway, the nozzle, the saturator region, the circumferential passageway, and the fluid outlet,
- wherein at least a portion of the inner wall that is exposed to the circumferential passageway comprises a first material,
- wherein at least a portion of the outer wall that is exposed to the circumferential passageway comprises a second material, and wherein the first material has a lower thermal conductivity than the second material.

Aspect 28. The apparatus of aspect 27, or any preceding aspect, wherein the apparatus is configured to transport the sample flow along the central passageway in a manner that is parallel to, but in an opposition direction of, a fluid flow of the mixture in the circumferential passageway.

Aspect 29. The apparatus of aspect 27 or 28, or any preceding aspect, wherein a temperature of at least a portion of the outer wall that is exposed to the circumferential passageway is configured to be actively controlled.

Aspect 30. The apparatus of any one of aspects 23-29, or any preceding aspect, wherein the apparatus is configured to not provide a separate carrier fluid flow comprising a carrier fluid and vaporized working liquid for combining with the sample flow in the saturator region.

Aspect 31. The apparatus of any one of aspects 23-30, or any preceding aspect, wherein the apparatus does not comprise an additional fluid inlet configured to introduce an additional fluid flow comprising carrier gas and a vaporized working liquid.

Aspect 32. The apparatus of any one of aspects 23-31, or any preceding aspect, wherein the saturator region is substantially free of, or does not contain, one or more porous structures that are configured to facilitate generation of the working liquid vapor.

Aspect 33. The apparatus of any one of aspects 23-32, or any preceding aspect, wherein the working liquid comprises a pool of working liquid or a stream of working liquid.

Aspect 34. The apparatus of any one of aspects 23-33, or any preceding aspect, wherein the fluidics system is configured to monitor a depth of the working liquid on the saturator surface to control a surface area of the working liquid and supplying additional working liquid to maintain a target range of the surface area, detecting contamination in or degradation of the working liquid, transferring the working liquid between the saturator surface and a reservoir, heating the working liquid, monitoring a system tilt angle or any combination thereof.

Aspect 35. The apparatus of any one of aspects 23-34, or any preceding aspect, wherein the fluidics system comprises a reservoir in fluid communication with the saturator surface, the reservoir configured to supply the working liquid to the saturator surface.

Aspect 36. The apparatus of any one of aspects 23-35, or any preceding aspect, wherein the fluidics systems comprises at least one sensor and at least one pump operably connected thereto, the at least one sensor configured to monitor the depth of the working liquid on the saturator surface, and the at least one pump configured to maintain a target depth of the working liquid on the saturator surface for controlling the surface area of the working liquid by transferring working liquid from the reservoir.

Aspect 37. The apparatus of aspect 36, or any preceding aspect, wherein the at least one pump is configured to transfer at least a portion of the working liquid from the saturator surface to the reservoir on system shutdown or, after loss of power, on power restoration.

Aspect 38. The apparatus of any one of aspects 23-37, or any preceding aspect, wherein the fluidics system comprises at least one heating element integrated into or attached to the saturator surface, the reservoir if present, or a channel connecting the saturator surface and the reservoir if present, the at least one heating element configured to heat the working liquid and facilitate generation of a working liquid vapor.

Aspect 39. The apparatus of any one of aspects 23-38, or any preceding aspect, wherein the fluidics system is configured to provide the working liquid on the saturator surface as a static pool, a flowing pool, a static thin film, or a flowing thin film.

Aspect 40. The apparatus of any one of aspects 23-39, or any preceding aspect, wherein the working liquid is present.

Aspect 41. The apparatus of any one of aspects 23-40, or any preceding aspect, wherein the working liquid is present and comprises propylene glycol, water, isobutanol, n-butanol, sec-butanol, tert-butanol, isopropanol, 1-propanol, dimethyl phthalate, dioctyl phthalate, dim ethylsulphoxide, or any combination thereof.

Aspect 42. The apparatus of any one of aspects 23-41, or any preceding aspect, wherein the working liquid is present and has a dynamic viscosity of 0.0001 to 1.0 $Ns/m^2$, a boiling point of 80° C. to 230° C., a specific gravity of 0.8 to 2.0 g/mL, or any combination thereof.

Aspect 43. The apparatus of any one of aspects 23-42, or any preceding aspect, wherein the saturator surface is configured to support less than 5000 mL of working liquid.

Aspect 44. The apparatus of any one of aspects 23-43, or any preceding aspect, further comprising a plenum positioned between the condenser and the fluid outlet, the plenum configured to converge fluid flow from the circumferential passageway.

Aspect 45. The apparatus of any one of aspects 23-44, or any preceding aspect, further comprising an optical particle counter in fluid communication with the fluid outlet, the optical particle counter for detecting the enlarged particles.

Aspect 46. The apparatus of aspect 45, or any preceding aspect, wherein the optical particle counter detects the enlarged particles using at least one of scattering, extinction, interferometry, emission, or any combination thereof.

Aspect 47. The apparatus of aspect 45 or aspect 46, or any preceding aspect, wherein the optical particle counter comprises a condensation nuclei particle counter.

Aspect 48. The apparatus of any one of aspects 23-47, or any preceding aspect, wherein the apparatus is configured to attach to a manifold, and the manifold is configured to supply the sample flow to the apparatus.

Aspect 49. The apparatus of any one of aspects 23-48, or any preceding aspect, further comprising a docking station, wherein the docking station comprises connections for vacuum, power, data, analog input output, digital input output, an ethernet switch, or any combination thereof.

Aspect 50. The apparatus of aspect 49, or any preceding aspect, wherein the docking station further comprises an internet protocol address.

Aspect 51. The apparatus of any one of aspects 23-50, or any preceding aspect, further comprising:
a connection for attaching the fluid outlet directly or indirectly to a vacuum system, and
a flow distribution system for splitting a flow from the vacuum system into a first stream of the sample flow and a second stream for cooling components of the apparatus.

Aspect 52. The apparatus of any one of aspects 23-51, or any preceding aspect, wherein the working liquid comprises a working liquid surface, and the nozzle is configured to direct the sample flow toward the working liquid surface without causing formation of bubbles of the sample flow in a bulk working liquid beneath the working liquid surface.

Aspect 53. The apparatus of any of the preceding aspects, wherein the work fluid liquid is in a reservoir which is equipped with one or more of: (i) a passive combination valve allowing for operation of fluid transport system without pressure buildup and/or fluid to be moved into and out of the reservoir and prevents leaks while in transit, (ii) a service port allowing for a system working fluid flush during service to keep the working liquid pure and/or (iii) locking Luer fittings to seal a working liquid reservoir during service and/or operation.

Aspect 54. The apparatus of any of the preceding aspects, further comprising a cover for covering the saturator surface, which cover may be perforated or unperforated, wherein the cover is optionally positioned such that one or more gaps, in conjunction with perforations if present, allow the working liquid vapor to be in fluid communication with the sample flow in the saturator region.

Aspect 55. The apparatus of any of the preceding aspects, having a removable and replaceable working liquid container comprising one or more of a working liquid reservoir, a fluid level sensor, fluid level status indication, and working liquid transport pump.

Aspect 56. The apparatus of any of the preceding aspects, further comprising one or more flow sensors for monitoring the flow rate of the sample flow passing through the apparatus, optionally wherein the flow sensor is positioned downstream and in fluid communication with the particle counter.

Aspect 57. The apparatus of any of the preceding aspects, further comprising one or more environmental sensors, optionally to monitor and change operational set points to maintain performance or for self protection in extreme environments.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Every device, system, formulation, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A method for detecting or growing particles, comprising:
   providing an apparatus comprising a working liquid and a saturator region, wherein the working liquid comprises a bulk working liquid having a working liquid surface exposed to and interacting with a sample flow, the working liquid surface characterized by a surface area, and the working liquid is positioned on a saturator surface in the saturator region,
   evaporating at least a portion of the working liquid to form a working liquid vapor,
   directing the sample flow comprising particles into the working liquid vapor positioned in the saturator region, resulting in a mixture comprising the sample flow and the working liquid vapor, wherein the mixture is in turbulent flow, transporting the mixture through a condenser and cooling the mixture therein, wherein at least a portion of the working liquid vapor condenses on at least a portion of the particles of the sample flow and increases the size of the particles of the sample flow, thereby generating enlarged particles, directing the enlarged particles to a particle counter, and controlling the surface area exposed to the saturator region by monitoring at least one of a depth of the working liquid on the saturator surface, the surface area exposed to the saturator region, or a volume of the working liquid on the saturator surface.

2. The method of claim 1, further comprising supplying additional working liquid to maintain;

a target range of the surface area, wherein the target range of the surface area is 0.01 to 500 $cm^2$;

a target range of the depth, wherein the target range of the depth is 0.001 to 100 mm; and/or a target range of the volume, wherein the target range of the volume is 0.001 to 5000 mL.

3. A method for detecting or growing particles, comprising:

providing an apparatus comprising a working liquid and a saturator region, wherein the working liquid comprises a bulk working liquid having a working liquid surface exposed to the saturator region characterized by a surface area, and the working liquid is positioned on a saturator surface in the saturator region, evaporating at least a portion of the working liquid to form a working liquid vapor, directing a sample flow comprising particles into the working liquid vapor and toward the working liquid surface, resulting in a mixture of the sample flow and the working liquid vapor, wherein the mixture is in turbulent flow, and transporting the mixture through a condenser and cooling the mixture therein, wherein at least a portion of the working liquid vapor condenses on at least a portion of the particles of the sample flow and increases the size of the particles of the sample flow, thereby generating enlarged particles, and directing the enlarged particles to a particle counter.

4. The method of claim 1, wherein the working liquid comprises a pool of working liquid or a stream of working liquid.

5. The method of claim 1, wherein the directing step causes the sample flow to travel into the working liquid vapor and/or against the working liquid surface without causing formation of bubbles of the sample flow in the bulk working liquid beneath the working liquid surface.

6. The method of claim 1, wherein the mixture consists of the sample flow and the working liquid vapor and wherein the working liquid vapor is in contact with the working liquid surface.

7. The method of claim 1, wherein the evaporating step is substantially free of, or does not employ, one or more porous structures configured to facilitate generation of the working liquid vapor.

8. The method of claim 1, wherein the working liquid has a dynamic viscosity of 0.0001 to 1.0 $Ns/m^2$, a boiling point of 80° C. to 230° C., a specific gravity of 0.8 to 2.0 g/mL, or any combination thereof.

9. The method of claim 1, wherein the sample flow has substantially laminar flow prior to the directing step and during the transporting step.

10. The method of claim 1, wherein the condenser comprises an inner wall positioned along a vertical axis of the apparatus and defining a central passageway, and an outer wall positioned along the vertical axis and encircling the inner wall, wherein a circumferential passageway is formed between the inner wall and the outer wall, at least a portion of the inner wall that is exposed to the circumferential passageway comprises a first material, at least a portion of the outer wall that is exposed to the circumferential passageway comprises a second material, and the first material has a lower thermal conductivity than the second material, and the method further comprises cooling at least a portion of the outer wall that is exposed to the circumferential passageway and flowing the sample flow through the central passageway to the directing step, wherein the transporting is performed in the circumferential passageway, and the flowing is parallel to, but in an opposite direction of, the transporting.

11. The method of claim 1, further comprising detecting the enlarged particles using the particle counter; wherein the particle counter is an optical particle counter based on detection of scattering, extinction, interferometry, emission, or any combination thereof or a non-optical particle counter based on Coulter method, charging/measuring charge, zeta potential, or vision based particle counting systems.

12. An apparatus for detecting or growing particles, comprising:
- a saturator region comprising a saturator surface, the saturator surface configured to support a working liquid that generates a working liquid vapor, wherein the working liquid, when present, comprises a bulk working liquid having a working liquid surface exposed to the saturator region, the working liquid surface characterized by a surface area,
- a fluid inlet in fluid communication with the saturator region, the fluid inlet terminating at a nozzle configured to direct a sample flow comprising particles against and/or into the working liquid vapor to produce a mixture in turbulent flow, the mixture comprising the sample flow and the working liquid vapor,
- a condenser in fluid communication with the saturator region, the condenser configured to receive and cool the mixture for condensing at least a portion of the working liquid vapor onto at least a portion of the particles, thereby forming enlarged particles,
- a fluid outlet in fluid communication with the condenser configured to receive the enlarged particles, and
- a fluidics system configured to control the surface area exposed to the saturator region by monitoring at least one of a depth of the working liquid on the saturator surface, the surface area exposed to the saturator region, or a volume of the working liquid on the saturator surface.

13. The apparatus of claim 12, wherein the fluidics system is configured to supply additional working liquid to maintain:

a target range of the surface area, wherein the target range of the surface area is 0.01 to 500 $cm^2$;

a target range of the depth, wherein the depth is 0.001 to 100 mm; and/or a target range of the volume, wherein the volume is 0.001 to 5000 mL.

14. The apparatus of claim 12, further comprising:

a vertical axis, wherein the condenser comprises an inner wall positioned along the vertical axis and defining a central passageway, and an outer wall positioned along the vertical axis and encircling the inner wall, wherein a circumferential passageway is formed between the inner wall and the outer wall, wherein the central passageway is in fluid communication with and positioned between the fluid inlet and the nozzle, the circumferential passageway is in fluid communication with and positioned between the saturator region and the fluid outlet, and a fluid flow path is sequentially defined by the fluid inlet, the central passageway, the nozzle, the saturator region, the circumferential passageway, and the fluid outlet, wherein at least a portion of the inner wall that is exposed to the circumferential passageway comprises a first material, wherein at least a portion of the outer wall that is exposed to the circumferential passageway comprises a second material, and wherein the first material has a lower thermal conductivity than the second material, and wherein a temperature of at least a portion of the outer wall that is exposed to the circumferential passageway is configured to be actively controlled.

15. The apparatus of claim 14, wherein the apparatus is configured to transport the sample flow along the central passageway in a manner that is parallel to, but in an opposition direction of, a fluid flow of the mixture in the circumferential passageway.

16. The apparatus of claim 12, wherein the saturator region is substantially free of, or does not contain, one or more porous structures that are configured to facilitate generation of the working liquid vapor.

17. The apparatus of claim 12, wherein the working liquid comprises a pool of working liquid or a stream of working liquid.

18. The apparatus of claim 12, wherein the fluidics system is configured to monitor a depth of the working liquid on the saturator surface to control a surface area of the working liquid and supplying additional working liquid to maintain a target range of the surface area, detecting contamination in or degradation of the working liquid, transferring the working liquid between the saturator surface and a reservoir, heating the working liquid, monitoring a system tilt angle or any combination thereof.

19. The apparatus of claim 12, wherein the fluidics system comprises a reservoir in fluid communication with the saturator surface, the reservoir configured to supply the working liquid to the saturator surface.

20. The apparatus of claim 12, wherein the fluidics systems comprises at least one sensor and at least one pump operably connected thereto, the at least one sensor configured to monitor the depth of the working liquid on the saturator surface, and the at least one pump configured to maintain a target depth of the working liquid on the saturator surface for controlling the surface area of the working liquid by transferring working liquid from the reservoir.

21. The apparatus of claim 20, wherein the at least one pump is configured to transfer at least a portion of the working liquid from the saturator surface to the reservoir on system shutdown or, after loss of power, on power restoration.

22. The apparatus of claim 12, wherein the fluidics system comprises at least one heating element integrated into or attached to the saturator surface, the reservoir if present, or a channel connecting the saturator surface and the reservoir if present, the at least one heating element configured to heat the working liquid and facilitate generation of a working liquid vapor.

23. The apparatus of claim 12, wherein the working liquid is present and comprises propylene glycol, water, isobutanol, n-butanol, sec-butanol, tert-butanol, isopropanol, 1-propanol, dimethyl phthalate, dioctyl phthalate, dimethylsulphoxide, or any combination thereof.

24. The apparatus of claim 12, wherein the working liquid is present and has a dynamic viscosity of 0.0001 to 1.0 $Ns/m^2$, a boiling point of 80° C. to 230° C., a specific gravity of 0.8 to 2.0 g/mL, or any combination thereof.

25. The apparatus of claim 12, wherein the saturator surface is configured to support less than 5000 mL of working liquid.

26. The apparatus of claim 12, further comprising a plenum positioned between the condenser and the fluid outlet, the plenum configured to converge fluid flow from the circumferential passageway.

27. The apparatus of claim 12, further comprising an optical particle counter in fluid communication with the fluid outlet, the optical particle counter for detecting the enlarged particles: wherein the optical particle counter detects the enlarged particles using at least one of scattering, extinction, interferometry, emission, or any combination thereof.

28. The apparatus of claim 27, wherein the optical particle counter comprises a condensation nuclei particle counter.

29. The apparatus of claim 12, wherein the apparatus is configured to attach to a manifold, and the manifold is configured to supply the sample flow to the apparatus.

30. The apparatus of claim 23, further comprising a docking station, wherein the docking station comprises connections for vacuum, power, data, analog input output, digital input output, an ethernet switch, or any combination thereof.

31. The apparatus of claim 12, further comprising:
 a connection for attaching the fluid outlet directly or indirectly to a vacuum system, and
 a flow distribution system for splitting a flow from the vacuum system into a first stream of the sample flow and a second stream for cooling components of the apparatus.

32. The apparatus of claim 12, wherein the working liquid comprises a working liquid surface, and the nozzle is configured to direct the sample flow toward the working liquid surface without causing formation of bubbles of the sample flow in a bulk working liquid beneath the working liquid surface.

33. The apparatus of claim 12, wherein the work fluid liquid is in a reservoir which is equipped with one or more of:
 (i) a passive combination valve allowing for operation of fluid transport system without pressure buildup and/or fluid to be moved into and out of the reservoir and prevents leaks while in transit,
 (ii) a service port allowing for a system working liquid flush during service to keep the working liquid pure, and/or
 (iii) locking Luer fittings to seal a working liquid reservoir during service and/or operation.

34. The apparatus of claim 12, further comprising a cover for covering the saturator surface, which cover may be perforated or unperforated, wherein the cover is optionally positioned such that one or more gaps, in conjunction with perforations if present, allow the working liquid vapor to be in fluid communication with the sample flow in the saturator region.

35. The apparatus of claim 12 having a removable and replaceable working liquid container comprising one or more of a working liquid reservoir, a fluid level sensor, fluid level status indication, and working liquid transport pump.

36. The apparatus of claim 12, further comprising one or more flow sensors for monitoring the flow rate of the sample flow passing through the apparatus, optionally wherein the flow sensor is positioned downstream and in fluid communication with the particle counter and/or further comprising one or more environmental sensors, optionally to monitor and change operational set points to maintain performance or for self protection in extreme environments.

37. The apparatus of claim 12, wherein the condenser is a wetted wall condenser.

38. The apparatus of claim 12, wherein the working liquid is transported and/or recirculated to and from the saturator region to allow for treatment of the working liquid to maintain or adjust the chemical composition and/or physical properties of the working liquid.

39. The apparatus of claim 12, wherein a flow of ambient air or gas is transported into thermal contact with components of the condenser and/or saturator region to provide for heat dissipation and/or thermal management.

40. The apparatus of claim 12, wherein the apparatus includes one or more diagnostics; wherein the diagnostics are achieved by
 analysis of one or more particle detection signals and/or temporal profiles of particle detection signals and/or
 achieved by analysis of pulse height, pulse width and/or pulse shape of one or more particle detection signals.

41. The apparatus of claim 40, wherein the diagnostics include monitoring working liquid properties, system flow properties, optical detection properties, and/or thermal management properties.

42. The apparatus of claim 40, wherein the diagnostics are based on pulse height analysis of the one or more particle detection signals on an individual particle detection event and/or historical for trend for monitoring of particle growth, system flow rate, sample particulate charge and/or material, fluid contamination, fluid degradation, or any combination thereof.

43. The apparatus of claim 12, further comprising one or more fluid sensor configured to monitor working liquid in the saturator region and/or a reservoir of working liquid; wherein one or more of the fluid sensors is configured for analysis of at least one of fluid contamination, fluid degradation, system orientation, remaining operating time, rate of fluid usage for health of system, or any combination thereof.

44. The apparatus of claim 12, further comprising one or more environmental sensors configured for analysis of at least one of changes in operational set points to maintain performance, system self-protection in case of extreme environment, or a combination thereof.

45. The apparatus of claim 12, comprising a plurality of saturator regions, a plurality of condensers, a plurality of particle counters or any combination of these.

46. The apparatus of claim 12, comprising a multistage CPC system, wherein different stages are provided in a sequential configuration and correspond to individual CPCs targeting different particle size ranges.

* * * * *